United States Patent
Kim et al.

(10) Patent No.: US 10,085,243 B2
(45) Date of Patent: Sep. 25, 2018

(54) WIRELESS COMMUNICATION METHOD AND WIRELESS COMMUNICATION TERMINAL

(71) Applicant: WILUS INSTITUTE OF STANDARDS AND TECHNOLOGY INC., Seoul (KR)

(72) Inventors: Yongho Kim, Incheon (KR); Juhyung Son, Gyeonggi-do (KR); Jinsam Kwak, Gyeonggi-do (KR)

(73) Assignee: Wilus Institute Of Standards And Technology Inc., Seoul (KR)

( * ) Notice: Subject to any disclaimer, the term of this patent is extended or adjusted under 35 U.S.C. 154(b) by 83 days.

(21) Appl. No.: 15/322,720

(22) PCT Filed: Jul. 1, 2015

(86) PCT No.: PCT/KR2015/006770
§ 371 (c)(1),
(2) Date: Dec. 28, 2016

(87) PCT Pub. No.: WO2016/003195
PCT Pub. Date: Jan. 7, 2016

(65) Prior Publication Data
US 2017/0135087 A1    May 11, 2017

(30) Foreign Application Priority Data

Jul. 1, 2014    (KR) .................. 10-2014-0081663
Jul. 22, 2014    (KR) .................. 10-2014-0092329

(51) Int. Cl.
*H04W 72/04*    (2009.01)
*H04W 84/12*    (2009.01)

(52) U.S. Cl.
CPC ........ *H04W 72/0406* (2013.01); *H04W 84/12* (2013.01)

(58) Field of Classification Search
CPC ......... H04W 72/0406; H04W 72/0413; H04W 72/042; H04W 72/0426; H04W 72/0433;
(Continued)

(56) References Cited

U.S. PATENT DOCUMENTS

2014/0044117 A1    2/2014 Stacey et al.

FOREIGN PATENT DOCUMENTS

| WO | 2011/065749 | 6/2011 |
| WO | 2011/115431 | 9/2011 |

(Continued)

OTHER PUBLICATIONS

International Search Report for PCT/KR2015/006770 dated Oct. 21, 2015 and its English translation from WIPO.
(Continued)

*Primary Examiner* — Ian N Moore
*Assistant Examiner* — Brian T Le
(74) *Attorney, Agent, or Firm* — Ladas & Parry, LLP

(57) ABSTRACT

Provided is a wireless communication terminal. The wireless communication terminal includes a transceiver configured to transmit and receive a wireless signal and a processor configured to control an operation of the wireless communication terminal. The processor collects data to be transmitted to a plurality of terminals, generates an aggregate-MAC protocol data unit for transmitting data to the plurality of terminals at the same time, and transmits the aggregate-MAC protocol data unit to the plurality of terminals.

12 Claims, 24 Drawing Sheets

(58) Field of Classification Search
CPC ......... H04W 72/0446; H04W 72/0453; H04W 84/12; H04W 84/18
See application file for complete search history.

(56) References Cited

FOREIGN PATENT DOCUMENTS

| | | | |
|---|---|---|---|
| WO | WO 2011115431 A2 * | 9/2011 | ........... H04B 7/0643 |
| WO | 2012/030541 | 3/2012 | |
| WO | 2013/032124 | 3/2013 | |

OTHER PUBLICATIONS

Written Opinion of the International Searching Authority for PCT/KR2015/006770 dated Oct. 21, 2015 and its English machine translation by Google Translate.

* cited by examiner

WIRELESS COMMUNICATION METHOD AND WIRELESS COMMUNICATION TERMINAL

CROSS-REFERENCE TO RELATED APPLICATIONS

This application is the U.S. National Stage of International Patent Application No. PCT/KR2015/006770 filed on Jul. 1, 2015, which claims the priority to Korean Patent Application No. 10-2014-0081663 filed in the Korean Intellectual Property Office on Jul. 1, 2014, and Korean Patent Application No. 10-2014-0092329 filed in the Korean Intellectual Property Office on Jul. 22, 2014, the entire contents of which are incorporated herein by reference.

TECHNICAL FIELD

The present invention relates to a wireless communication method and a wireless communication terminal for setting a broadband link. More specifically, the present invention relates to a wireless communication method and a wireless communication terminal for increasing data communication efficiency by expanding a data transmission bandwidth of a terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

An object of the present invention is to provide an efficient wireless communication method and wireless communication terminal.

Another object of the present invention is to provide a wireless communication method and a wireless communication terminal allowing simultaneous data transmission between a station and an AP.

Technical Solution

To achieve these and other advantages and in accordance with the purpose of the present invention, as embodied and broadly described, there is provided a wireless communication terminal including: a transceiver configured to transmit and receive a wireless signal; and a processor configured to control an operation of the wireless communication terminal, wherein the processor collects data to be transmitted to a plurality of terminals, generates an aggregate-MAC protocol data unit for transmitting data to the plurality of terminals at the same time, and transmits the aggregate-MAC protocol data unit to the plurality of terminals.

The transceiver may transmit a first frame indicating a transmission preparation of the aggregate-MAC protocol data unit.

The first frame may include a plurality of terminal identifiers for identifying the plurality of respective terminals and the number of the plurality of terminals.

An arrangement order of the plurality of terminal identifiers may indicate an arrangement order of channels allocated to the plurality of terminals.

The transceiver may transmit the first frame through an available channel other than a primary channel and a secondary channel extending the primary channel.

The transceiver may transmit the first frame through one channel among a plurality of available channels and transmit a second frame indicating a data transmission preparation for one terminal through the remaining available channels except for the one channel.

The transceiver may transmit the aggregate-MAC protocol data unit through an available channel other than a primary channel and a secondary channel extending the primary channel.

The aggregate-MAC protocol data unit may include a plurality of MAC protocol data units and the first MAC protocol data unit among the plurality of MAC protocol data units may be a header for signaling data in the aggregate-MAC protocol data unit. The header may include a group address for identifying a group indicating the plurality of terminals.

The header may include information on a channel used by the wireless communication terminal and a modulation and coding scheme (MCS) of a signal used in the channel.

The header may include user information indicating a relationship between the plurality of MAC protocol data units in the aggregate MAC protocol data unit and the plurality of terminals.

According to another aspect of the present invention, there is provided a wireless communication terminal includes: a transceiver configured to transmit and receive a wireless signal; and a processor configured to control an operation of the wireless communication terminal, wherein the transceiver receives an aggregate-MAC protocol data unit for transmitting data to a plurality of terminals at the same time, and the processor obtains a MAC protocol data unit relating to the wireless communication terminal from the aggregate-MAC protocol data unit The transceiver may receive a first frame indicating a transmission preparation of the aggregate-MAC protocol data unit.

The first frame may include a plurality of terminal identifiers for identifying the plurality of respective terminals and the number of the plurality of terminals.

An arrangement order of the plurality of terminal identifiers may indicate an arrangement order of channels allocated to the plurality of terminals; the processor may determine a channel allocated to the wireless communication terminal based on the arrangement order of the plurality of terminal identifiers; and the transceiver may transmit a control frame to the wireless communication terminal transmitting the aggregate-MAC protocol data unit through the channel allocated to the wireless communication terminal.

An arrangement order of the plurality of terminal identifiers may indicate a transmission order between the plurality of terminals transmitting a control frame to a wireless communication terminal transmitting the aggregate-MAC protocol data unit; the processor may determine a transmission order between the plurality of terminals based on the arrangement order of the plurality of terminal identifiers; and the transceiver may transmit the control frame to the wireless communication terminal transmitting the aggregate-MAC protocol data unit through a channel allocated to the wireless communication terminal.

The plurality of terminals may transmit the control frame through one specified channel.

The control frame may be a frame indicating that data transmission is available.

The processor may obtain information on a channel used by the wireless communication terminal and a modulation and coding scheme (MCS) of a signal used in the channel based on the aggregate-MAC protocol data unit.

According to a further another aspect of the present invention, there is provided an operation method of a wireless communication terminal including: collecting data to be transmitted to a plurality of terminals; generating an aggregate-MAC protocol data unit for transmitting data to the plurality of terminals at the same time; and transmitting the aggregate-MAC protocol data unit.

Advantageous Effects

According to the present invention, an embodiment provides an efficient wireless communication method and wireless communication terminal.

Especially, an embodiment of the present invention provides a wireless communication method and a wireless communication terminal allowing simultaneous data transmission between an access point and a plurality of stations.

MODE FOR CARRYING OUT THE INVENTION

Figure 1:
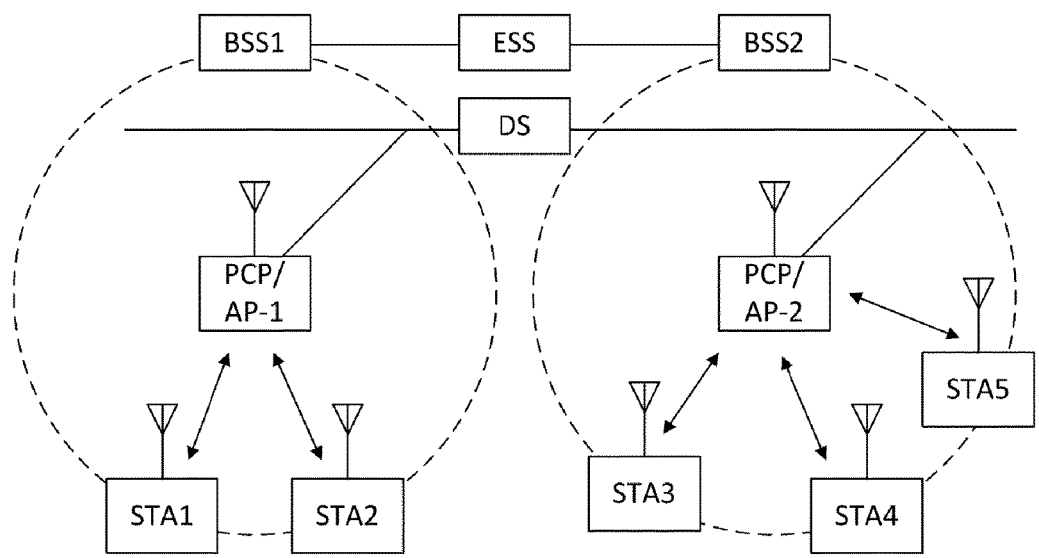
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2014-0081663, and 10-2014-0092329 filed in the Korean Intellectual Property Office and the embodiments and mentioned items described in the respective applications are included in the Detailed Description of the present application.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
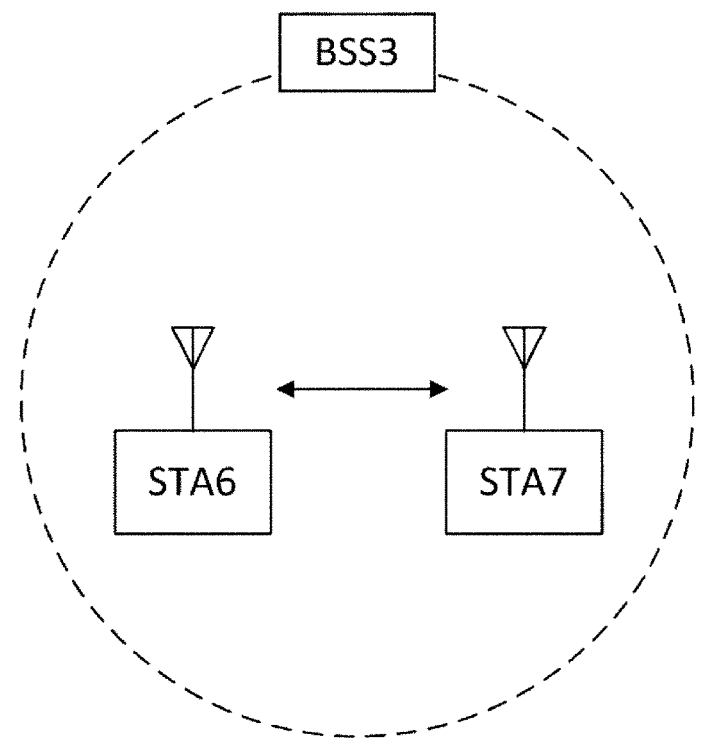
FIG. 2 is a view illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
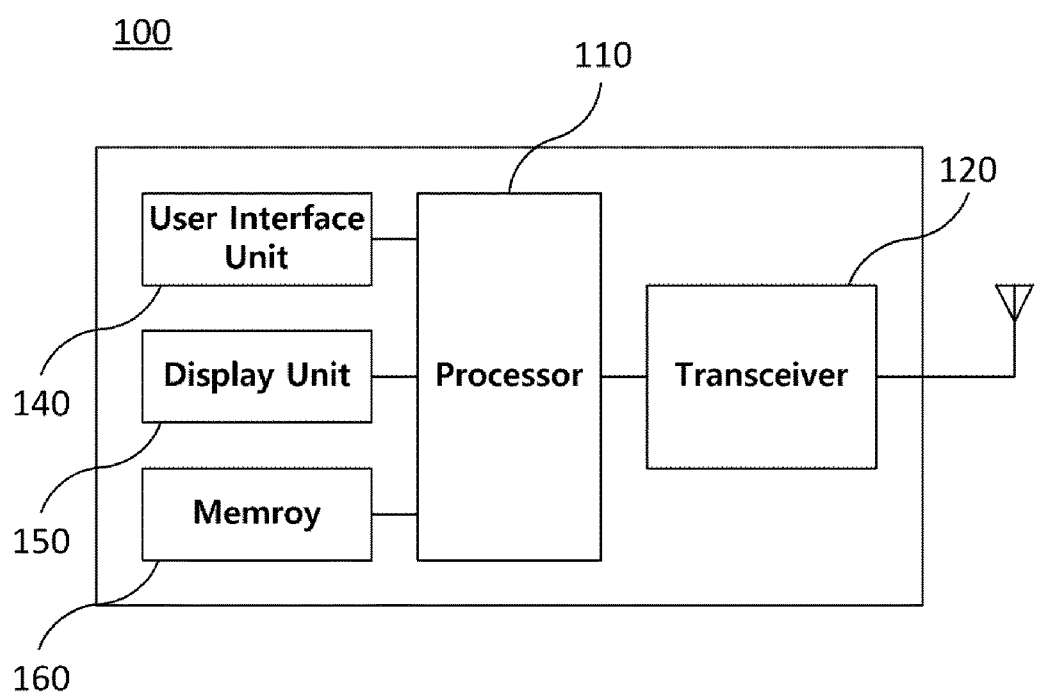
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units.

According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
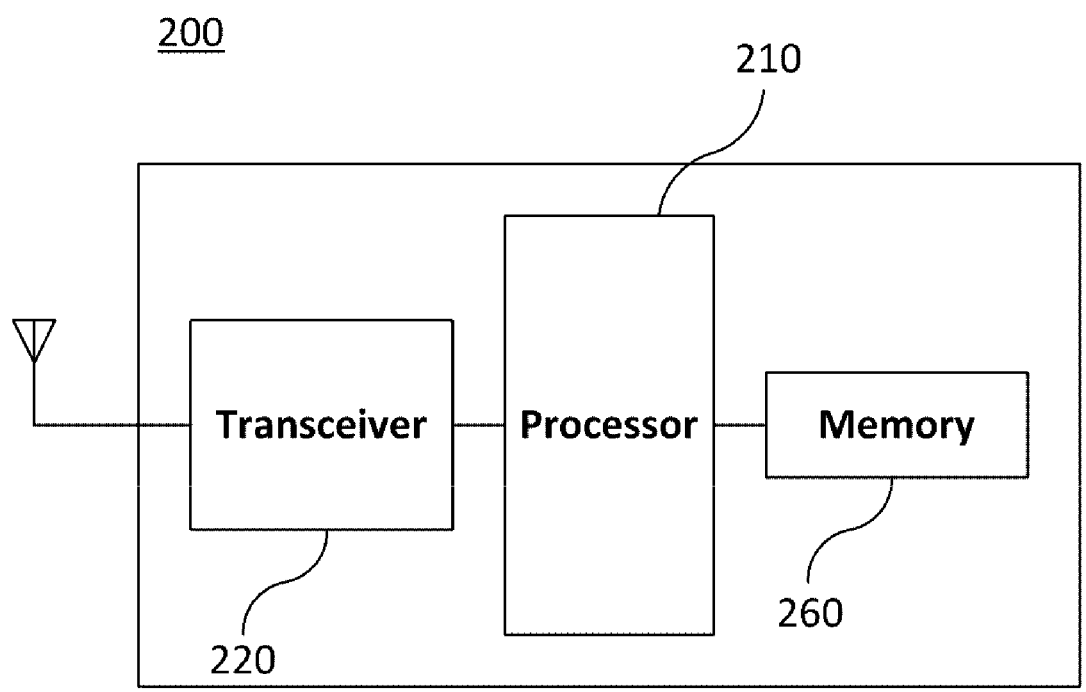
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
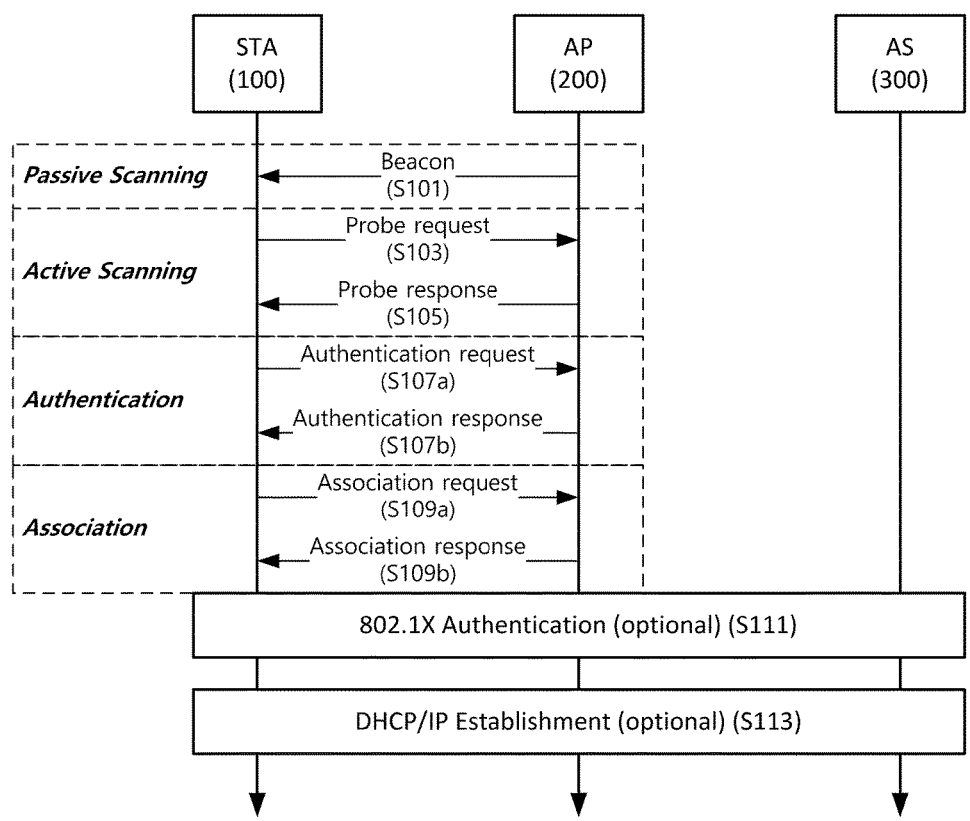
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using Orthogonal Frequency Division Multiple Access (OFDMA), any one terminal may transmit data to a plurality of terminals simultaneously. However, a frequency channel that a terminal transmitting data uses is limited. Therefore, a terminal transmitting data is required to efficiently allocate an available frequency channel and transmit the data. In addition, the sizes of data that a terminal transmitting data transmits to a plurality of terminals at the same time may be all different. Therefore, it may be inefficient to allocate frequency channels of the same size to all terminals receiving data. When a terminal transmitting data aggregates data to be transmitted to a plurality of terminals and transmits the aggregated data to the plurality of terminals at the same time by using all available frequency channels, it may use an available frequency without waste. Additionally, in this case, a terminal transmitting data is not required to perform a complicated operation for allocating an available frequency channel to each terminal receiving data. Accordingly, a data transmission method through an aggregate-MAC protocol data unit where a plurality of MAC protocol data units including data to be transmitted to a plurality of terminals are aggregated is required. At this point, an aggregate-MAC protocol data unit for transmitting data to a plurality of terminals at the same time is different from an existing aggregate-MAC protocol data unit (A-MPDU) that aggregates MPDUs to be transmitted to the same address and transmits MPDUs. Accordingly, an aggregate-MAC protocol data unit for transmitting data to a plurality of terminals at the same time is referred to as plural terminal A-MPDUs or plural station A-MPDUs. Additionally, a terminal for transmitting data to a plurality of terminals using OFDMA is referred to as a transmission terminal and each of a plurality of terminals for receiving data at the same time using OFDMA is referred to as a reception terminal. At this point, data that a transmission terminal transmits and a reception terminal receives is referred to as plural terminal data. At this point, a transmission terminal may transmit different data corresponding to each reception terminal to each of a plurality of reception terminals at the same time. Additionally, the plurality of terminal data may be the plural terminal A-MPDUs described above. In a specific embodiment, a transmission terminal may be an access point. Additionally, a reception terminal may be a station associated with an access point. Transmitting data to a plurality of terminals using OFDMA will be described with reference to FIGS. 6 to 24.

Figure 6:
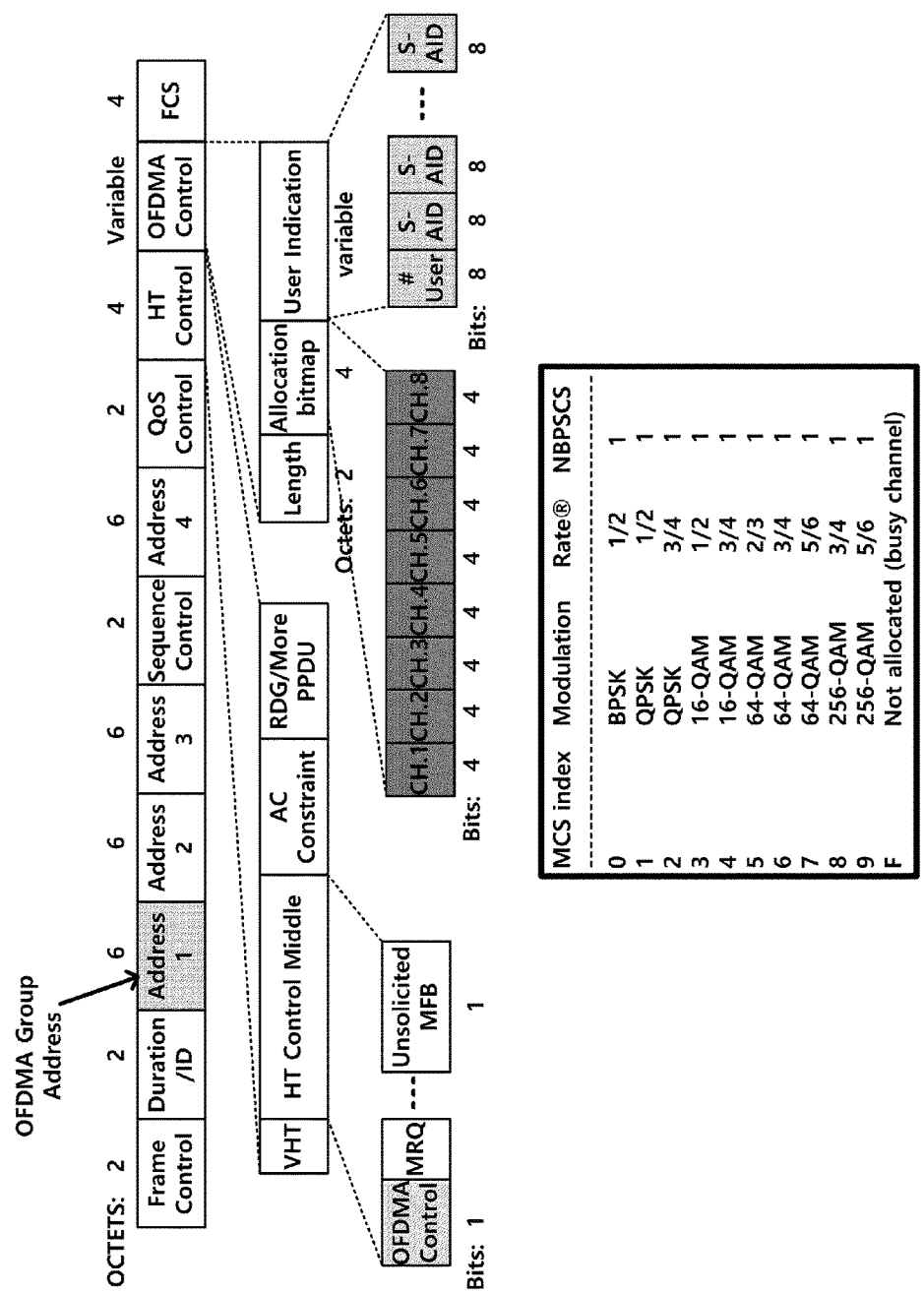
FIG. 6 is a view illustrating the header of an aggregate-MAC protocol data unit for transmitting data to a plurality of terminals at the same time according to an embodiment of the present invention.

FIG. 6 is a view illustrating the header of an aggregate-MAC protocol data unit for transmitting data to a plurality of terminals at the same time according to an embodiment of the present invention.

A plurality of terminal data may include a header for signaling data in the plurality of terminal data. In a specific embodiment, plural terminal A-MPDUs may include a plurality of MAC protocol data units (MPDUs) to be transmitted to a plurality of terminals. The plural terminal A-MPDUs may include a header for signaling data in the plural terminal A-MPDUs. Specifically, the header of the plural terminal A-MPDUs may be one MPDU. Additionally, such a header may be positioned at the first of the plural terminal A-MPDUs. Accordingly, a reception terminal may obtain information on data that the plural terminal A-MPDUs include by obtaining the first MPDU in the plural terminal A-MPDUs. Additionally, the headers of a plurality of terminal data may be transmitted through a predetermined modulation and coding scheme (MCS). Through this, a reception terminal may receive information on a plurality of terminal data signaled by a header by decoding the header through a predetermined MCS without additional information. For example, when a header is specified to be transmitted through BPSK 1/2 and is one MPDU that is positioned at the first of plural terminal A-MPDUs, a reception terminal sets an MCS to BPSK 1/2 and decodes the first MPDU of the plural terminal A-MPDUs to obtain a header.

The headers of a plurality of terminal data may include a group address for identifying a group that represents a plurality of reception terminals. At this point, a reception terminal may receive a plurality of terminal data based on the group address. Specifically, when the group address represents a group to which the reception terminal belongs, the reception terminal may receive a plurality of terminal data. Specifically, the group address may be an identifier indicating the addresses of a plurality of terminals that receive signals using OFDMA. At this point, a group identifier may be referred to as an OFDMA group address. Additionally, the headers of a plurality of terminal data may include information on a channel and an MCS of a signal used in the channel. In more detail, the headers of a plurality of terminal data may include information on a channel that a transmission terminal uses. In addition, the headers of a plurality of terminal data may include information on a channel that another terminal which is different from a transmission terminal is using and is thus not allocated. Additionally, the headers of a plurality of terminal data may include information on a channel that transmits signals through the same MCS. Accordingly, a reception terminal may receive a plurality of terminal data based on information on a channel and the MCS of a signal used in the channel. In addition, the header may include a terminal identifier for identifying a reception terminal. At this point, the terminal identifier may be an identifier for identifying a station. For example, the terminal identifier may be an Association ID (AID) assigned from an AP during an association process between an STA and the AP and identifying an association between the STA and the AP. In addition, the terminal identifier may be a short-AID (S-AID), which is simply made using only the lower 8 bits of the AID. In addition, the headers of a plurality of terminal data may include user information indicating a relationship between data in the plurality of terminal data and a plurality of reception terminals. Specifically, the user information may include the number of reception terminals. In addition, the user information may include an arrangement order of MPDUs including data corresponding to the reception terminal. In a specific embodiment, the arrangement order of a terminal identifier in the headers of a plurality of terminal data may represent the arrangement order of data corresponding to a terminal that the terminal identifier represents among a plurality of data in a plurality of terminal data. For example, when the header includes information on a terminal identifier in the order of a terminal identifier for a first terminal and a terminal identifier for a second terminal, data on the first terminal may be positioned first and data on the second terminal may be positioned following that. In another specific embodiment, the user information may include the identifier of a terminal and offset information representing the position of data including data on a corresponding terminal. For example, when offset information on the first terminal indicates 0 byte and offset information on the second terminal indicates 12 bytes, data including data on the second terminal may be positioned after 12 bytes from the headers of a plurality of terminal data. Through such a specific embodiment, a reception terminal may extract data relating to the reception terminal from a plurality of terminal data based on a relationship between a plurality of data in the plurality of terminal data and a plurality of terminals that are to receive the plurality of terminal data. However, when an S-AID is used as a terminal identifier as described above, S-AIDs for different terminals may be identical to each other. In such a case, after the reception terminal extracts data corresponding to its own S-AID from the plurality of terminal data, the reception terminal is required to check whether data on itself is correct through the header included in the extracted data.

Specifically, the syntax of the header of the plurality of terminal data may be obtained by modifying the syntax of the MPDU of the existing 802.11ac standard as shown in FIG. 6. Specifically, an Address 1 field may represent the group identifier described above. Additionally, a reserved bit field that is a bit positioned at the first part of the HT Control Middle field may represent that a corresponding MPDU is the headers of a plurality of terminal data. Specifically, when the reserved bit field is 1, this field may indicate that a corresponding MPDU is the header of the plurality of terminal data. Specifically, the reserved bit field may indicate that transmission information (e.g., an OFDMA control) on a plurality of terminals including a variable-length allocation bitmap and a user indication is included. In a specific embodiment, the reserved bit may be referred to as an OFDMA control bit.

Additionally, a Body field including data that an MPDU transmits may include information for signaling a plurality of terminal data. Specifically, the Body field including data that an MPDU transmits may include an Allocation Bitmap field indicating information on a channel and an MCS of a signal used in the channel. The Allocation Bitmap field may be divided into a plurality of channel (CH) fields, and each of the plurality of CH fields may indicate an MCS of a signal used in the corresponding channel. Specifically, each of the plurality of CH fields may include index information indicating an MCS of a signal used in the channel. At this time, the index information may indicate that the other terminal uses a channel currently and the channel is unavailable. In a specific embodiment, the Allocation Bitmap field may be a 4-byte field. In addition, each CH field is a 4-bit field, and the Allocation Bitmap field may include 8 CH fields. Additionally, a transmission terminal may simultaneously transmit a plurality of terminal data to a plurality of terminals through a channel through which signals having the same MCS are transmitted. Specifically, a transmission terminal may transmit a piece of a plurality of terminal data through a plurality of channels through which signals having the same MCS are transmitted. Specifically, the index information may be the same as the MCS index information of FIG. 6. For example, if the 8 CH fields in the Allocation Bitmap field have values of 0001, 0001, 0001, 0011, 0011, 1111, 1111 and 0101, respectively, a transmission terminal modulates signals through QPSK 1/2 and transmits one of the plural terminal A-MPDUs through CH 1, CH 2, and CH 3. At this point, the transmission terminal modulates signals through QPSK 3/4 and transmits one A-MPDU through CH 4 and CH 5. At this point, CH 6 and CH 7 as busy channels indicate that they are being used by other terminals. In addition, the transmission terminal modulates signals through 64-QAM 2/3and transmits plural terminal A-MPDUs through CH 8.

In addition, the Body field may include a User Indication field indicating a relationship between a plurality of data included in a plurality of terminal data and a plurality of reception terminals. Specifically, the User Indication field may include a user field #User indicating the number of all terminals to receive a plurality of terminal data and a field indicating a terminal identifier for identifying a terminal. As described above, the arrangement order of terminal identifiers may indicate the arrangement order of data corresponding to a terminal indicated by a terminal identifier among a plurality of data in a plurality of terminal data. In addition, the terminal identifier may be an Association ID (AID) assigned from an AP during an association process between an STA and the AP and identifying an association between the STA and the AP. In addition, the terminal identifier may be a short-AID (S-AID), which is simply made using only the lower 8 bits of the AID.

The headers of a plurality of terminal data may be referred to as an OFDMA header. At this point, the above-described group identifier may be an identifier indicating the addresses of a plurality of terminals that receive a signal using OFDMA. At this point, the group identifier may be referred to as an OFDMA group address.

Figure 7:
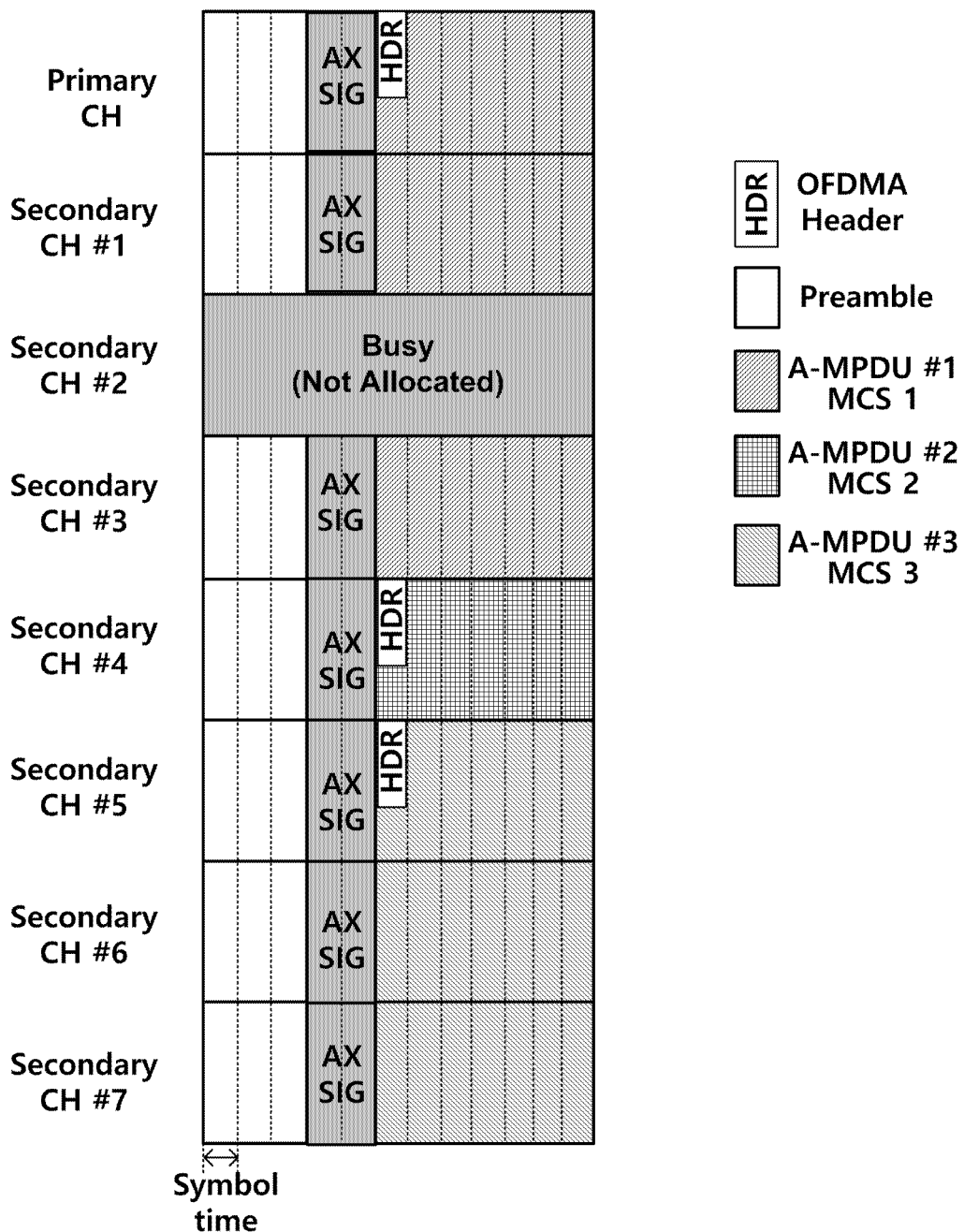
FIG. 7 is a view of allocating a primary channel and a secondary channel to a plurality of terminals to transmit an aggregate-MAC protocol data unit for transmitting data to a plurality of terminals at the same time according to an embodiment of the present invention.

FIG. 7 is a view of allocating a primary channel and a secondary channel to a plurality of terminals to transmit an aggregate-MAC protocol data unit for transmitting data to a plurality of terminals at the same time according to an embodiment of the present invention.

As described above, a transmission terminal may perform OFDMA transmission for transmitting data simultaneously to a plurality of terminals through a channel through which signals having the same MCS is transmitted. Specifically, a transmission terminal may transmit a plurality of terminal data through a plurality of frequency channels through which signals using the same MCS are transmitted. Also, the transmission terminal may transmit a plurality of terminal data using all available frequency channels. At this point, the transmission terminal may transmit a signal including information relating to data encoding after transmitting the preamble of a wireless signal. The information relating to data encoding may include an MCS. In addition, the transmission terminal may transmit a signal including information relating to data encoding by a unit of 20 MHz. Such a signal is referred to as AX-SIG. The reception terminal may receive plural terminal A-MPDUs based on AX-SIG. Specifically, the reception terminal may determine that a channel through which signals using the same MCS is transmitted is a channel through which a plurality of terminal data is transmitted. In addition, the reception terminal may determine that a channel in which the preamble and AX-SIG are not detected is a channel not allocated to a terminal. Accordingly, when decoding, the reception terminal may exclude the channel from which the preamble and AX-SIG are not detected. Also, as described above, the transmission terminal may insert the information relating to data encoding in the header of the plurality of terminal data to transmit the information relating to data encoding. At this point, the reception terminal may obtain the information relating to encoding based on the header of the plurality of terminal data. Specifically, the reception terminal may obtain the information on MCS based on the header of the plurality of terminal data. Additionally, the reception terminal may obtain the information on an unallocated channel based on the header of the plurality of terminal data. Specifically, the reception terminal may obtain information relating to data encoding based on information on a channel in the headers of a plurality of terminal data and an MCS of a signal transmitted from the channel. For example, the reception terminal may obtain the information relating to encoding based on the Allocation Bitmap field in the headers of a plurality of terminal data. At this point, the plurality of terminal data may be the plural terminal A-MPDUs.

In the embodiment of FIG. 7, signals using the same MCS are transmitted from a primary channel Primary CH, a first secondary channel Secondary CH #1, and a third secondary channel Secondary CH #3. Also, signals using the same MCS are transmitted from a fifth secondary channel Secondary CH #5, a sixth secondary channel Secondary CH #6, and a seventh secondary channel Secondary CH #7. Also, as in the above-described embodiment, the headers of plural terminal A-MPDUs are transmitted first among data in the plural terminal A-MPDUs. At this point, a reception terminal may obtain information on the plurality of MPDUs in the plural terminal A-MPDUs by extracting the first MPDU in the plural terminal A-MPDUs. Specifically, the reception terminal may extract the first MPDU in the plural terminal A-MPDUs to obtain information on a channel and an MCS used by a signal transmitted to the channel. In addition, the reception terminal may know information on the position of an MPDU including data on the reception terminal. Through this, the reception terminal may know whether the data in the MPDU is related to the reception terminal without decoding the header of the MPDU. However, as described above, when an S-AID is used as a terminal identifier, the S-AID for the different terminals may be the same. In this case, the reception terminal may decode the header of the MPDU to determine whether the MPDU contains data on the reception terminal.

FIGS. 8 to 11 are views that an access point transmits data to a plurality of stations through an aggregate-MAC protocol data unit for transmitting data to a terminal at the same time according to an embodiment of the present invention.

A transmission terminal may transmit a plurality of terminal data using only a secondary channel instead of a primary channel in consideration of compatibility with a legacy terminal using the prior art. Specifically, a transmission terminal may transmit a plurality of terminal data using a secondary channel other than a secondary channel that extends a primary channel among a plurality of secondary channels. A terminal using a conventional technique such as 802.11ac transmits data only through a primary channel or an extended channel in which a primary channel and a secondary channel are connected. Accordingly when only a secondary channel other than a primary channel is used or a secondary channel other than a secondary channel extending a primary channel is used to transmit a plurality of terminal data, data may be transmitted to both a terminal according to an embodiment of the present invention and a terminal that does not support an embodiment of the present invention. The specific operation of a terminal may be as follows.

The transmission terminal may collect data to be transmitted for a predetermined time. Such a predetermined time may be referred to as a Data Accumulation Timer. At this point, the transmission terminal may wait without transmitting data even if a channel is in an idle state during the Data Accumulation Timer. After collecting data to be transmitted, the transmission terminal obtains a channel to be used in transmission according to a contention method. Specifically, when a channel is in an idle state for a predetermined time, the transmission terminal transmits a Ready To Send (RTS) frame, which is a frame indicating data transmission prepared after waiting for a contention window value, to a plurality of channels. At this point, the predetermined time may be Distributed Inter-Frame Space (DIFS) defined by the 802.11 standard. At this point, the transmission terminal transmits an RTS frame for a legacy terminal through a primary channel, and an RTS frame for a terminal supporting an embodiment of the present invention may be transmitted through a secondary channel other than a primary channel. Alternatively, the transmission terminal transmits an RTS frame for a legacy terminal through a primary channel and a secondary channel that extends a primary channel, and an RTS frame for a terminal supporting an embodiment of the present invention may be transmitted through a secondary channel other than a secondary channel extending a primary channel among a plurality of secondary channels. Additionally, the reception terminal may receive signals transmitted from all channels. In addition, the reception terminal may determine whether its address is identical to a Receiver Address (RA) of an RTS frame. If its address is identical to the receiver address (RA) of the RTS frame, the reception terminal receiving the RTS frame may transmit a Clear To Send (CTS) frame indicating that data transmission is available after a predetermined time from a time point at which the RTS frame is transmitted in response to the RTS frame. At this point, the predetermined time may be a Short Inter-Frame Space (SIFS). The transmission terminal transmits data to a plurality of terminals after a predetermined time from the CTS frame in response to the CTS frame. At this point, the predetermined time may be an SIFS. At this point, the transmission terminal may transmit data for a legacy terminal through a primary channel, and transmit data for a terminal supporting an embodiment of the present invention to a plurality of terminal data through a secondary channel. Alternatively, the transmission terminal may transmit data for a legacy terminal through a primary channel and a secondary channel extending the primary channel. At this point, the transmission terminal may transmit data for a terminal supporting an embodiment of the present invention as a plurality of terminal data through a secondary channel other than a secondary channel that extends a primary channel among a plurality of secondary channels. In more detail, the transmission terminal may transmit data for a terminal supporting an embodiment of the present invention as a plurality of terminal data through a plurality of secondary channels other than a secondary channel that extends a primary channel among a plurality of secondary channels. At this point, the plurality of terminal data may be the plural terminal A-MPDUs. The transmission terminal may determine whether a channel is in an idle state for a predetermined time before transmitting the data to determine whether the channel is available or not. At this point, the predetermined time may be a Point Inter-Frame Space (PIFS). In addition, when it is determined that the channel is available, the transmission terminal may transmit data through a corresponding channel. The reception terminal that receives the data may transmit an ACK frame indicating data reception completion. In addition, if data to be transmitted remains, the transmission terminal may determine a channel state again and transmit the remaining data. At this point, the transmission terminal may resume the transmission procedure of a plurality of terminal data by transmitting an RTS frame after a predetermined time after transmitting the ACK frame. In another specific embodiment, a channel to be used in transmission is obtained depending on a contention method. Specifically, when a channel is in an idle state for a predetermined time, the transmission terminal transmits a Ready To Send (RTS) frame, which is a frame indicating data transmission prepared, to a plurality of channels, after waiting for a contention window value. At this point, the predetermined time may be Distributed Inter-Frame Space (DIFS) defined by the 802.11 standard.

Figure 8:
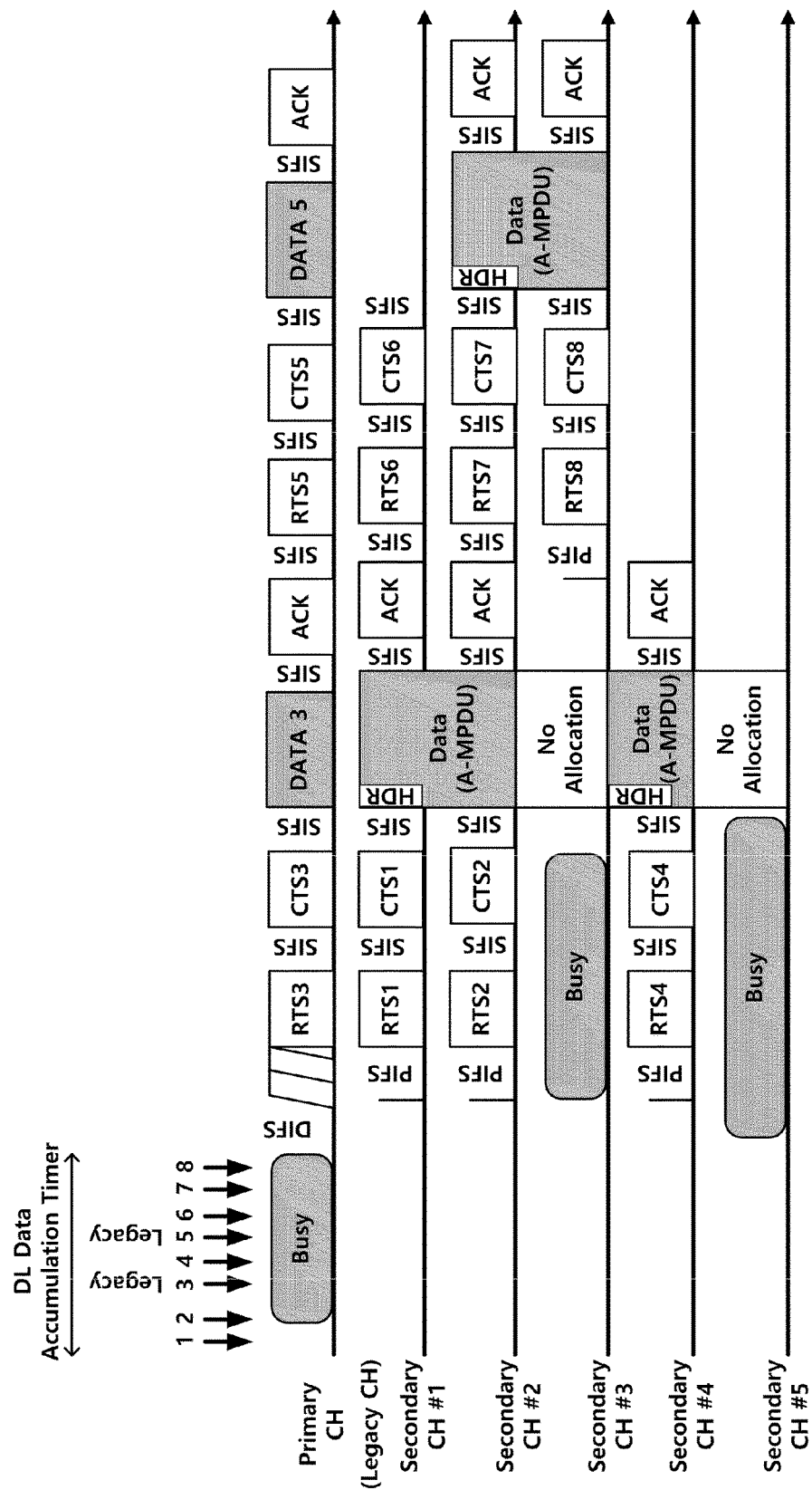
FIGS. 8 to 11 are views that an access point transmits data to a plurality of stations through an aggregate-MAC protocol data unit for transmitting data to a plurality of terminals at the same time according to an embodiment of the present invention.

FIG. 8 is a view illustrating the transmission of plural terminal A-MPDUs through only a secondary channel other than a primary channel according to an embodiment of the present invention.

The numbers written in the frames of the drawing in this specification indicate numbers for stations that receive or transmit corresponding frames. For example, an RTS frame received by a first station is indicated by RTS1, and a CTS frame transmitted by the first station is denoted by CTS1.

In the embodiment of FIG. 8, a transmission terminal is an access point. Also, terminals receiving data from a terminal that transmits plural terminal A-MPDUs are a first station, a second station, a third station, a fourth station, a fifth station, a sixth station, a seventh station, and an eighth station. At this point, the third station and the fifth station are legacy terminals that do not support an embodiment of the present invention. The access point transmits data to the third station and the fifth station that do not support an embodiment of the present invention through a primary channel Primary CH.

Specifically, the access point transmits an RTS frame to the third station that does not support an embodiment of the present invention through a primary channel Primary CH. Then, the access point receives a CTS frame from the third station through the primary channel Primary CH. The access point transmits data to the third station through the primary channel Primary CH. After the transmission to the third station is completed, the access point transmits an RTS frame to the fifth station through the primary channel Primary CH. Then, the access point receives a CTS frame from the fifth station through the primary channel Primary CH. The access point transmits data to the fifth station through the primary channel Primary CH. In addition, the access point transmits plural terminal A-MPDUs to the first station, the second station, the fourth station, the sixth station, the seventh station, and the eighth station, which support an embodiment of the present invention, by using an available secondary channel. Specifically, the access point transmits plural terminal A-MPDUs including data for the first station and the second station through the first secondary channel Secondary CH #1 and the second secondary channel Secondary CH #2. Specifically, the access point transmits an RTS frame to the first station and the second station, which support an embodiment of the present invention, through the first secondary channel Secondary CH #1 and the second secondary channel Secondary CH #2. Then, the access point receives a CTS frame through the first secondary channel Secondary CH #1 and the second secondary channel Secondary CH #2. The access point transmits plural terminal A-MPDUs including data for the first station and the second station to the first station and the second station through the first secondary channel Secondary CH #1 and the second secondary channel Secondary CH #2. Additionally, the access point transmits the plural terminal A-MPDUs to the fourth station through the fourth secondary channel Secondary CH #4. After the data transmission to the first station, the second station, and the fourth station is completed, the access point determines an available channel again and transmits data for the seventh station and the eighth station. Specifically, the access point transmits plural terminal A-MPDUs including data for the seventh station and the eighth station to the seventh station and the eighth station through the second secondary channel Secondary #2 and the third secondary channel Secondary #3.

Figure 9:
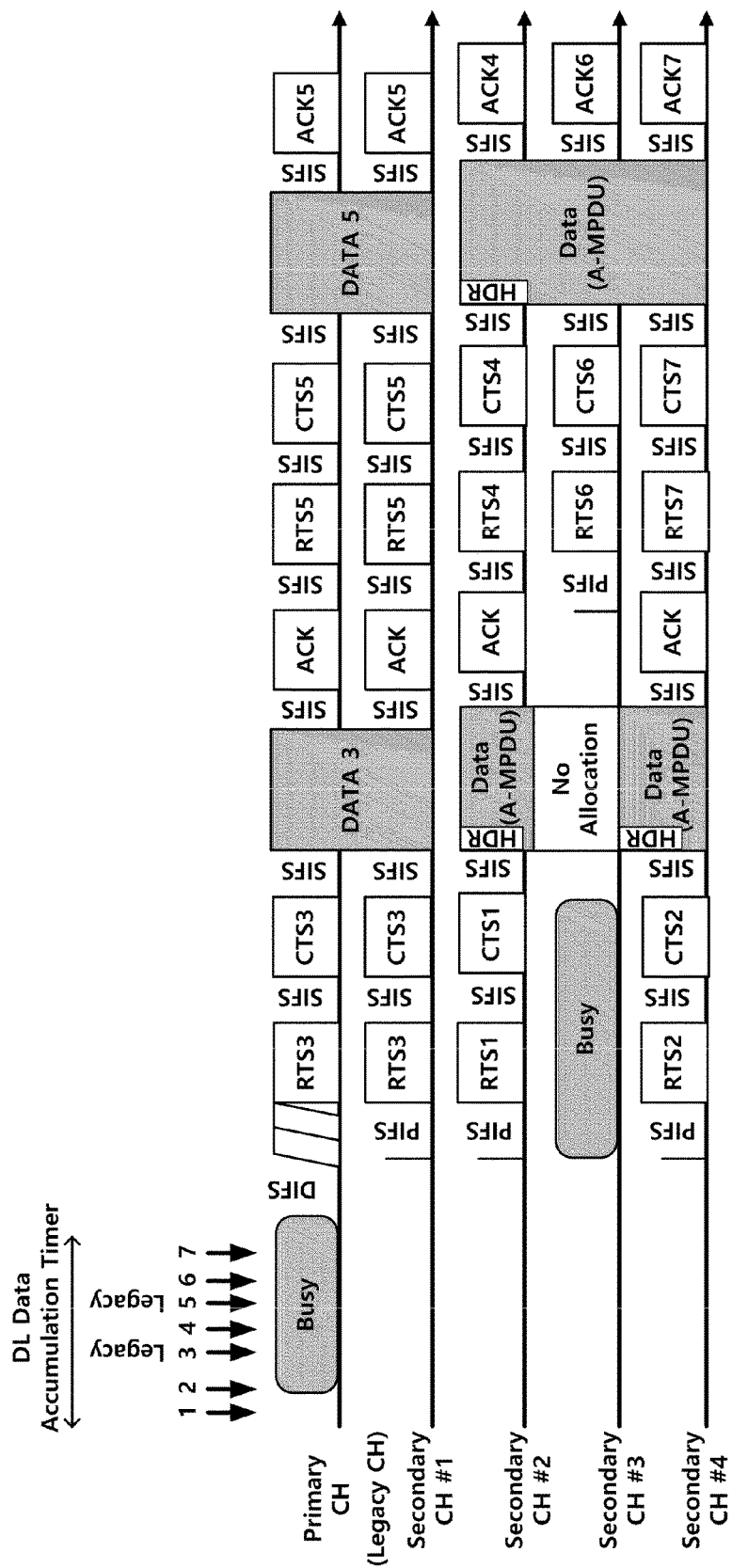

FIG. 9 is a view illustrating the transmission of plural terminal A-MPDUs through a secondary channel other than a secondary channel extending a primary channel among a plurality of secondary channels according to an embodiment of the present invention.

In the embodiment of FIG. 9, a transmission terminal is an access point. Also, terminals receiving data from a terminal that transmits plural terminal A-MPDUs are a first station, a second station, a third station, a fourth station, a fifth station, a sixth station, and a seventh station. At this point, the third station and the fifth station are legacy terminals that do not support an embodiment of the present invention. The access point transmits data to the third station and the fifth station that do not support an embodiment of the present invention through a primary channel Primary CH and a first secondary channel Secondary CH #1 extending the Primary channel Primary CH. Specifically, the access point transmits an RTS frame to the third station that does not support an embodiment of the present invention through the primary channel Primary CH and the first secondary channel Secondary CH #1. Then, the access point receives a CTS frame from the third station through the primary channel Primary CH and the first secondary channel Secondary CH #1. Additionally, the access point transmits data to the third station through the primary channel Primary CH and the first secondary channel Secondary CH #1. After the transmission to the third station is completed, the access point transmits an RTS frame to the fifth station through the primary channel Primary CH and the first secondary channel Secondary CH #1. Then, the access point receives a CTS frame from the fifth station through the primary channel Primary CH and the first secondary channel Secondary CH #1. Additionally, the access point transmits data to the fifth station through the primary channel Primary CH and the first secondary channel Secondary CH #1. In addition, the access point transmits plural terminal A-MPDUs to the first station, the second station, the fourth station, the sixth station, and the seventh station, which support an embodiment of the present invention, by using an available secondary channel. Specifically, the access point transmits plural terminal A-MPDUs including data for the first station through the second secondary channel Secondary CH #2. Specifically, the access point transmits an RTS frame to the first station supporting an embodiment of the present invention through the second secondary channel Secondary CH #2. Then, the access point receives a CTS frame from the first station through the second secondary channel Secondary CH #2. The access point transmits plural terminal A-MPDUs including data for the second station to the second station through the second secondary channel Secondary CH #2. Additionally, the access point transmits the plural terminal A-MPDUs to the second station through the fourth secondary channel Secondary CH #4. After the data transmission to the first station and the second station is completed, the access point determines an available channel again and transmits data for the fourth station, the sixth station, and the seventh station. Specifically, the access point transmits plural terminal A-MPDUs for the fourth station, the sixth station, and the seventh station through the second secondary channel Secondary #2, the third secondary channel Secondary #3, and the fourth secondary channel Secondary #4.

Figure 10:
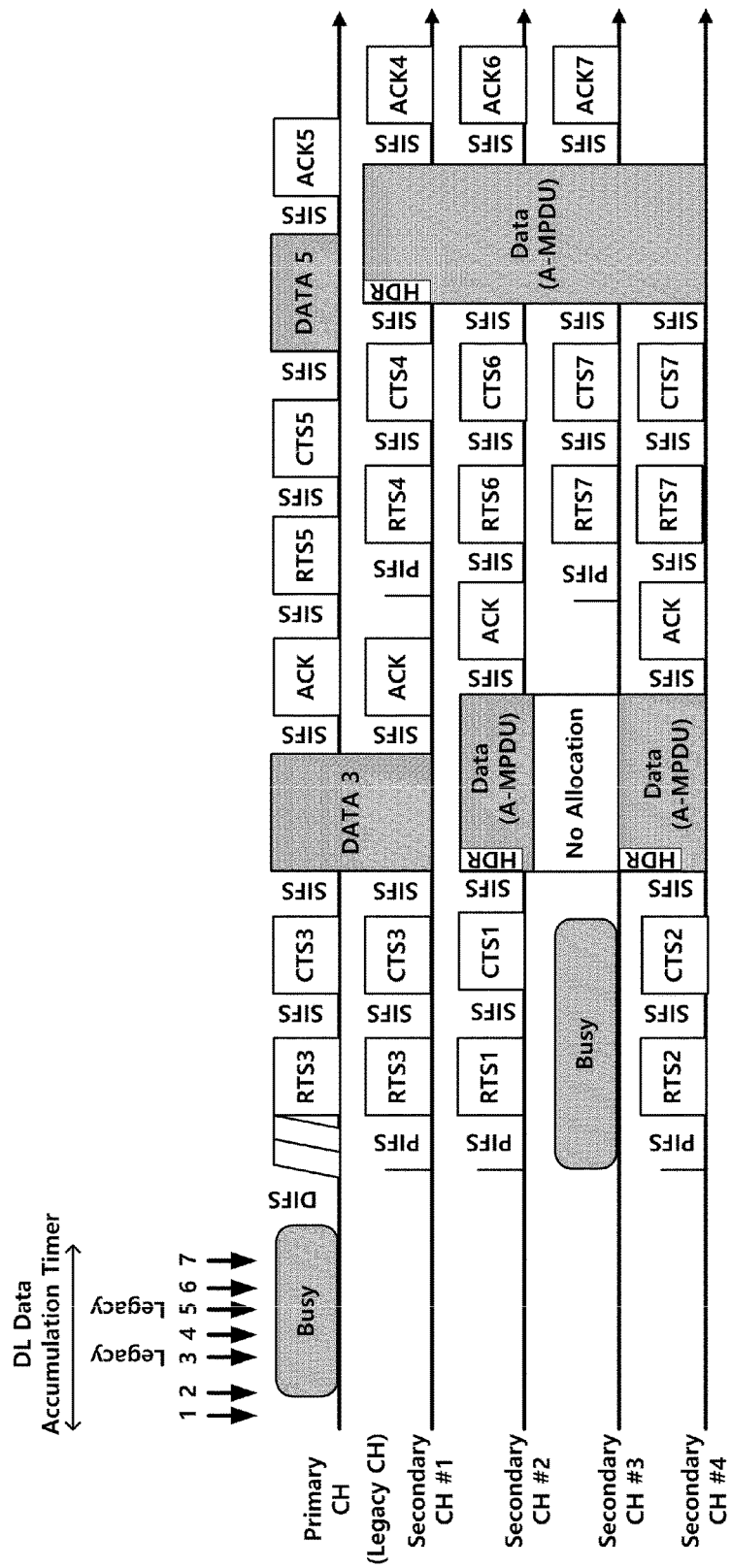

FIG. 10 is a view illustrating that a channel for transmitting plural terminal A-MPDUs extends dynamically based on an available channel according to an embodiment of the present invention.

In the embodiment of FIG. 10, a transmission terminal is an access point. Also, terminals receiving data from the transmission terminal are a first station, a second station, a third station, a fourth station, a fifth station, a sixth station, and a seventh station. At this point, the third station and the fifth station are legacy terminals that do not support an embodiment of the present invention. The access point transmits data to the third station that does not support an embodiment of the present invention through the primary channel Primary CH and the first secondary channel Secondary CH #1 extending the Primary channel Primary CH and also transmits data to the fifth station through the Primary channel Primary CH. Specifically, the access point transmits an RTS frame to the third station that does not support an embodiment of the present invention through the primary channel Primary CH and the first secondary channel Secondary CH #1. Then, the access point receives a CTS frame from the third station through the primary channel Primary CH and the first secondary channel Secondary CH #1. The access point transmits data to the third station through the primary channel Primary CH and the first secondary channel Secondary CH #1. The access point transmits an RTS frame to the fifth station through the primary channel Primary CH. Then, the access point receives a CTS frame from the fifth station through the primary channel Primary CH. The access point transmits data to the fifth station through the primary channel Primary CH. In addition, the access point transmits plural terminal A-MPDUs to the first station, the second station, the fourth station, the sixth station, and the seventh station, which support an embodiment of the present invention, by using an available secondary channel. Specifically, the access point transmits plural terminal A-MPDUs including data for the second station to the second station through the second secondary channel Secondary CH #2. Specifically, the access point transmits an RTS frame to the first station supporting an embodiment of the present invention through the second secondary channel Secondary CH #2. Then, the access point receives a CTS frame from the first station through the second secondary channel Secondary CH#2. The access point transmits plural terminal A-MPDUs including data for the first station to the first station through the second secondary channel Secondary CH #2. In addition, the access point transmits plural terminal A-MPDUs including data for the second station to the second station through the fourth secondary channel Secondary CH #4. After the data transmission to the first station and the second station is completed, the access point determines an available channel again and transmits data for the fourth station, the sixth station, and the seventh station. Specifically, the access point transmits plural terminal A-MPDUs for the fourth station, the sixth station, and the seventh station through the first secondary channel Secondary #1, the second secondary channel Secondary #2, the third secondary channel Secondary #3, and the fourth secondary channel Secondary #4, which are available during RTS frame transmission. Specifically, when transmitting data for the fourth station, the sixth station, and the seventh station, the access point identifies an available channel again to transmit an RTS frame, and receives a CTS frame. After receiving the CTS frame, the access point transmits plural terminal A-MPDUs through an available channel. The access point, as described above, may determine that a corresponding channel is available when the corresponding channel is in an idle state during a PIFS.

Figure 11:
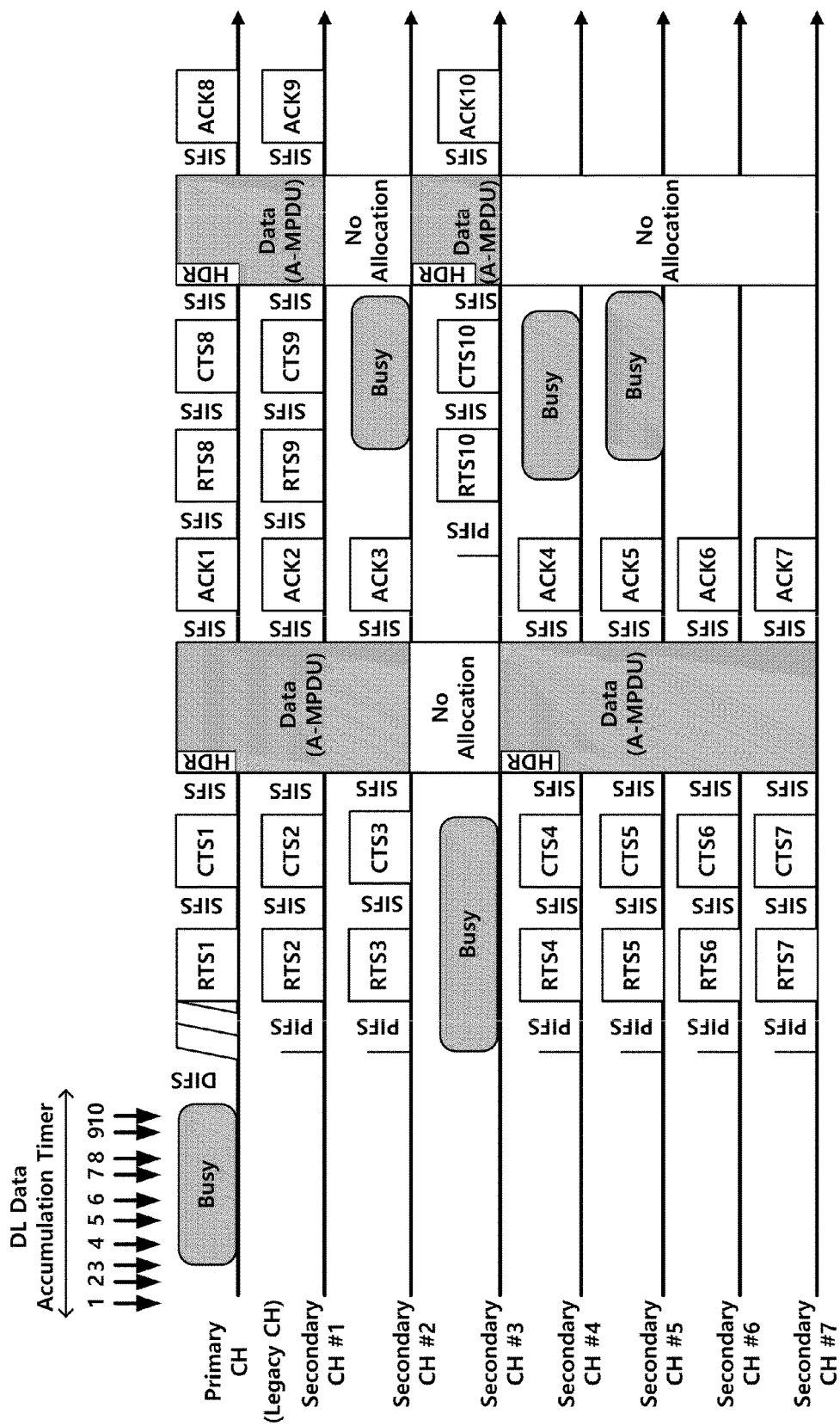

FIG. 11 is a view illustrating that a channel for transmitting plural terminal A-MPDUs may be changed dynamically based on an available channel.

In the embodiment of FIG. 11, a transmission terminal is an access point. Also, terminals receiving data from the transmission terminal are a first station, a second station, a third station, a fourth station, a fifth station, a sixth station, a seventh station, an eighth station, a ninth station, and a tenth station. The access point transmits plural terminal A-MPDUs to the first station, the second station, the third station, the fourth station, the fifth station, the sixth station, and the seventh station by using a primary channel Primary CH and a plurality of available secondary channels. Specifically, the access point transmits plural terminal A-MPDUs to the first station, the second station, the third station, the fourth station, the fifth station, the sixth station, and the seventh station through the primary channel Primary CH, the first secondary channel Secondary CH #1, the second secondary channel Secondary CH#2, the fourth secondary channel Secondary CH #4, the fifth secondary channel Secondary CH#5, the sixth secondary channel Secondary CH#6, and the seventh secondary channel Secondary CH#7. Specifically, the access point transmits an RTS frame to the first station, the second station, the third station, the fourth station, the fifth station, the sixth station, and the seventh station through the primary channel Primary CH, the first secondary channel Secondary CH #1, the second secondary channel Secondary CH#2, the fourth secondary channel Secondary CH #4, the fifth secondary channel Secondary CH#5, the sixth secondary channel Secondary CH#6, and the seventh secondary channel Secondary CH#7. The access point receives a CTS frame from the first station, the second station, the third station, the fourth station, the fifth station, the sixth station, and the seventh station through the primary channel Primary CH, the first secondary channel Secondary CH #1, the second secondary channel Secondary CH#2, the fourth secondary channel Secondary CH #4, the fifth secondary channel Secondary CH#5, the sixth secondary channel Secondary CH#6, and the seventh secondary channel Secondary CH#7. The access point transmits plural terminal A-MPDUs to the first station, the second station, the third station, the fourth station, the fifth station, the sixth station, and the seventh station through the primary channel Primary CH, the first secondary channel Secondary CH #1, the second secondary channel Secondary CH#2, the fourth secondary channel Secondary CH #4, the fifth secondary channel Secondary CH#5, the sixth secondary channel Secondary CH#6, and the seventh secondary channel Secondary CH#7. At this point, the access point may divide the plural terminal A-MPDUs into two to transmit the divided the plural terminal A-MPDUs. Specifically, the access point may transmit plural terminal A-MPDUs including data for the first station, the second station, and the third station through the primary channel Primary CH, the first secondary channel Secondary CH #1 and the second secondary channel Secondary CH#2, and transmit plural terminal A-MPDUs including data for the fourth station, the fifth station, the sixth station, and the seventh station through the fourth secondary channel Secondary CH #4, the fifth secondary channel Secondary CH#5, the sixth secondary channel Secondary CH#6, and the seventh secondary channel Secondary CH#7. After the data transmission to the first station, the second station, the fourth station, the fifth station, the sixth station, and the seventh station is completed, the access point determines an available channel again and transmits data for the eighth station, the ninth station, and the tenth station. Specifically, the access point determines an available channel before transmitting an RTS frame. As described above, the access point may determine that a channel is available when the channel is in an idle state during a PIFS. The access point transmits plural terminal A-MPDUs for the eighth station and the ninth station through the primary channel Primary CH and the first secondary channel Secondary CH #1. At this point, the access point determines that the third secondary channel Secondary #3, which was unavailable at the time of the first transmission of the plural terminal A-MPDUs, becomes available, and transmits the plural terminal A-MPDUs for the tenth station through the third secondary channel Secondary #3.

In the embodiments of FIGS. 9 to 11, the transmission terminal reserves a channel for transmitting a plurality of terminal data by using a conventional RTS frame and transmits the plurality of terminal data. In such a case, the transmission is required to transmit RTS frames by as many as the number of reception terminals so that the reception terminals recognize that data is transmitted. In addition, there is a problem that the reception terminals do not recognize whether they receive general data or a plurality of terminal data. Therefore, a new type of frame indicating the transmission preparation of a plurality of terminal data is required. This will be described with reference to FIGS. 12 to 20.

Figure 12:
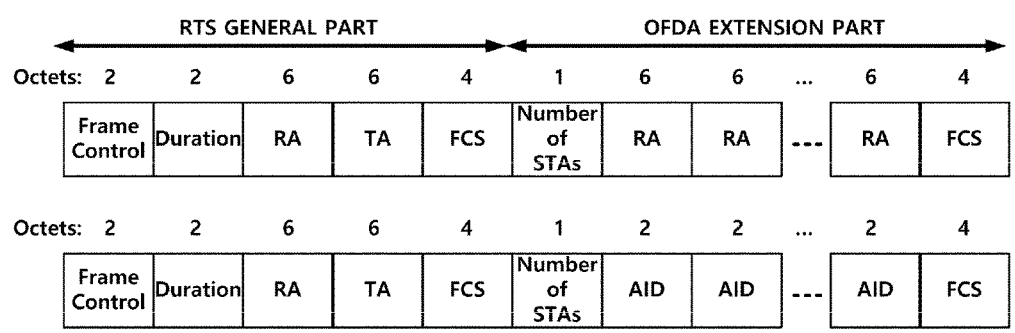
FIG. 12 is a view illustrating the structure of a frame indicating the simultaneous transmission preparation of a plurality of stations when data is transmitted to a plurality of terminals at the same time according to another embodiment of the present invention.

FIG. 12 is a view illustrating the structure of a frame indicating the transmission preparation of a plurality of terminal data when data is transmitted to a plurality of terminals at the same time according to another embodiment of the present invention.

A frame indicating the transmission preparation of a plurality of terminal data according to an embodiment of the present invention is referred to as an Aggregation-RTS (A-RTS) frame. The A-RTS frame may include a terminal identifier field indicating a terminal identifier for identifying a reception terminal. Specifically, the terminal identifier filed may indicate the address of a terminal. In another specific embodiment, the terminal identifier field may indicate an Association ID (AID) allocated in an association process between a terminal and a terminal. In addition, an A-RTS frame may include a number field of a terminal indicating the number of reception terminals. In addition, the A-RTS frame may include information on a channel that the reception terminal is to use. Specifically, the arrangement order of terminal identifiers in the identifier field in the A-RTS frame may indicate the arrangement order of channels allocated to a terminal indicated by a terminal identifier. At this point, the reception terminal may transmit a CTS frame through an allocated channel. In addition, the reception terminal may transmit an ACK frame through the allocated channel. For example, when an identifier indicating the first station is located and an identifier indicating the second station is located thereafter in the terminal identifier field, the first station transmits a CTS frame and an ACK frame using a primary channel and the second station transmits a CTS frame and an ACK frame using a first secondary channel. In addition, the A-RTS frame may include a field indicating a relationship of an MPDU in a plurality of terminal data and a reception terminal. In a specific embodiment, the arrangement order of terminal identifiers indicated by the terminal identifier field of an A-RTS frame may indicate the arrangement order of data corresponding to a terminal indicated by a terminal identifier among a plurality of data in a plurality of terminal data. Specifically, the arrangement order of terminal identifiers indicated by the terminal identifier field of an A-RTS frame may indicate the arrangement order of MPDUs corresponding to a terminal indicated by a terminal identifier among a plurality of MPDUs in plural terminal A-MPDUs. For example, when the terminal identifier field of an A-RTS frame includes terminal identifiers in the order of the terminal identifier for a first terminal and the terminal identifier for a second terminal, an MPDU including data for the first terminal may be located first and an MPDU for the second terminal may be located thereafter in plural terminal A-MPDUs. In another specific embodiment, an A-RTS frame may include offset information indicating the locations of the identifier of a terminal and data corresponding to a corresponding terminal. For example, when offset information for the first terminal indicates 0 byte and offset information for the second terminal indicates 12 bytes, an MPDU including data for the second terminal may be located after 12 bytes from the header of the plural terminal A-MPDUs.

The A-RTS frame may include a duration field indicating a value for updating a value of a Network Allocation Vector (NAV) as in a typical Mac frame format. The value of the duration field may be determined based on the transmission time of an A-RTS frame and the transmission time of a plurality of terminal data. Specifically, the value of the duration field may be the sum of the transmission time of an A-RTS frame, SIFS, the transmission time of a CTS frame, the transmission time of a plurality of terminal data, SIFS, and the transmission time of an ACK frame.

In addition, an A-RTS frame may be implemented in consideration of compatibility with a legacy terminal that does not support an embodiment of the present invention. A conventional RTS frame includes a frame control field indicating information on frame control, a duration field indicating a value for updating the value of NAV, an RA field indicating the address of a terminal for receiving the data, a TA field indicating the address of a terminal for transmitting data, and a FCS field including a cyclic redundancy check (CRC) value for error detection. At this point, the TA field may be the address of a terminal that transmits a plurality of terminal data. Specifically, the TA field may be the address of an access point that transmits a plurality of terminal data. At this point, the A-RTS frame may insert additional information after the FCS field of the conventional RTS frame. At this point, the legacy terminal decodes the FCS field and does not decode data included in the remaining A-RTS frames. Also, the value of the duration field, as described above, may be determined based on the A-RTS transmission time and the transmission time of a plurality of terminal data. At this point, a legacy terminal updates the NAV value with a value indicated by the duration field. Therefore, a legacy terminal does not transmit data until the transmission of a plurality of terminal data is completed. Also, a group identifier for identifying a group representing a plurality of terminals for receiving plural terminal A-RTSs may be inserted in an existing RA field. At this point, the group identifier may be the same as the group identifier indicating a plurality of terminals receiving the plurality of terminal data or the group identifier indicating a plurality of terminals receiving an OFDMA signal. When a value of an existing RA field indicates a group identifier, a terminal supporting an embodiment of the present invention may recognize an A-RTS frame. Therefore, a terminal supporting an embodiment of the present invention may decode a field after the conventional FCS field. In a specific embodiment, the structure of the A-RTS frame may be the same as that of FIG. 12. Specifically, the A-RTS frame includes a Number of STAs field indicating the number of reception terminals after the conventional FCS field, a terminal identifier field indicating a terminal identifier identifying a terminal receiving an A-MPDU, and an additional FCS field for error detection. At this point, the terminal identifier field may be divided into subfields by a number indicated by the number field of a terminal. Additionally, as described above, the terminal identifier filed may indicate the address of a terminal. In addition, the terminal identifier field may indicate an AID for identifying an association between a terminal and a terminal. Further, an additional FCS field may be a value obtained by calculating a CRC value of a field located after an existing FCS field.

FIGS. 13 to 20 are views illustrating that an access point transmits data to a plurality of stations through a frame indicating the transmission preparation of a plurality of terminal data according to another embodiment of the present invention.

A transmission terminal may transmit the A-RTS frame described above to the primary channel and a conventional RTS frame to the remaining available channels. The specific operation may be as follows. The transmission terminal may collect data to be transmitted for a predetermined time. Such a predetermined time may be referred to as a Data Accumulation Timer. At this point, the transmission terminal may wait without transmitting data even if a channel is in an idle state during the Data Accumulation Timer. After collecting data to be transmitted, the transmission terminal obtains a channel to be used in transmission according to a contention method. Specifically, when a channel is in an idle state for a predetermined time, the transmission terminal transmits an A-RTS to a primary channel after waiting for a contention window value and transmits an RTS frame to a plurality of remaining available channels. As described above, the determining of the available channel may determine whether the channel is in an idle state for a predetermined time. At this point, the predetermined time may be a PIFS. In addition, the RTS frame serves to prevent the reception of other terminals. The reception terminal may obtain information of a plurality of terminal data to be transmitted through the A-RTS frame transmitted through the primary channel. The reception terminal may transmit a CTS frame. Specifically, the reception terminals may transmit a CTS frame through an allocated channel. At this point, the reception terminal may determine a channel allocated to the reception terminal based on an A-RTS frame. Specifically, the reception terminal may determine a channel allocated to the reception terminal based on the terminal identifier arrangement order of the terminal identifier field of an A-RTS frame. In another specific embodiment, the reception terminal may determine a channel allocated to the reception terminal based on an RTS frame transmitted through a secondary channel. Specifically, when an RTS frame indicating that there is data to be received by the reception terminal together with the A-RTS frame of the primary channel, the reception terminal may determine that the channel to which the RTS frame is transmitted is allocated to the reception terminal. In addition, if the RTS frame indicating that there is data to be received by the reception terminal other than the A-RTS frame is not received, the reception terminal may determine that the primary channel is allocated to the reception terminal. In addition, the reception terminal may check whether a channel is available before transmitting the CTS frame. Specifically, the reception terminal may determine that a channel is available when the channel is in an idle state for a predetermined time. At this point, the predetermined time may be an SIFS. In a specific embodiment, if the reception terminal has an insufficient time to perform transmission through a transmission operation during a reception operation, the predetermined time may be the sum of an SIFS and a PIFS. The transmission terminal may transmit a plurality of terminal data to a terminal that transmitted a CTS frame. The reception terminal transmits an ACK frame through a channel allocated to the reception terminal. At this point, as described above, the reception terminal may determine a channel allocated to the reception terminal based on an A-RTS frame. In another specific embodiment, the reception terminal may determine a channel allocated to the reception terminal based on a plurality of terminal data. Specifically, the reception terminal may determine a channel allocated to the reception terminal based on the headers of a plurality of terminal data. Specifically, the reception terminal may determine a channel allocated to the reception terminal based on the terminal identifier field of the headers of a plurality of terminal data. Specifically, the reception terminal may determine a channel allocated to the reception terminal based on the terminal identifier field of the headers of a plurality of terminal data. For example, when the headers of a plurality of terminal data includes the identifier of a terminal in the order of the identifier of the first station and the identifier of the second station, the reception terminal may determine that the transmission terminal allocates the first channel among the available channels to the first station and allocates the next channel to the second station. Further, the reception terminal may determine a channel allocated to the reception terminal based on the arrangement order of the plurality of data in the plurality of terminal data. Specifically, the reception terminal may decode a plurality of terminal data, and determine a channel allocated to the reception terminal by checking the arrangement order of a plurality of data in the plurality of terminal data. For example, when plural terminal A-MPDUs include MPDUs in the order of the MPDU for the first station and the MPDU for the second station, the reception terminal may determine that the first channel among the available channels is allocated to the first station and the next channel is allocated to the second station.

Figure 13:
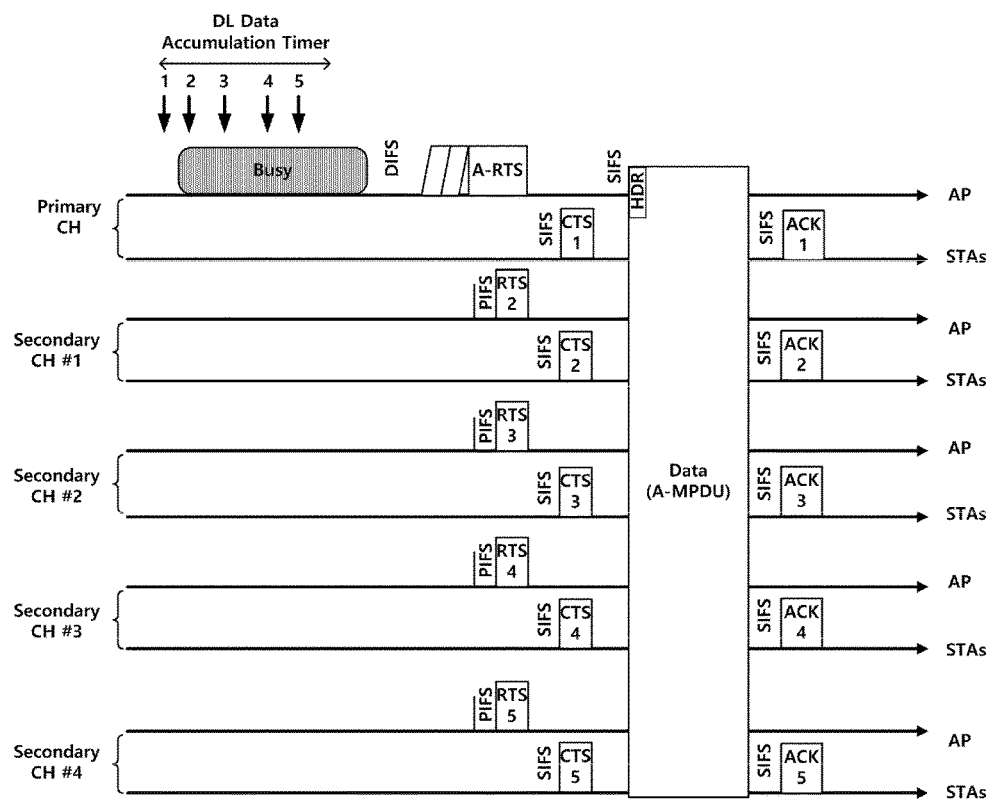
FIGS. 13 to 20 are views that an access point transmits data to a plurality of stations at the same time through a frame indicating the simultaneous transmission preparation for a plurality of stations according to another embodiment of the present invention.

FIG. 13 is a view illustrating that an access point transmits plural terminal A-MPDUs to a plurality of stations according to another embodiment of the present invention when the number of available channels is the same as the number of stations receiving the plural terminal A-MPDUs.

In the embodiment of FIG. 13, a transmission terminal is an access point. The first station, the second station, the third station, the fourth station, and the fifth station receive plural terminal A-MPDUs from the access point. As described above, the access point transmits the A-RTS frame through the primary channel. The access point also transmits the RTS frame through an available secondary channel. The first station, the second station, the third station, the fourth station, and the fifth station transmit the CTS frame through the allocated channel as described above. At this point, the first station, the second station, the third station, the fourth station, and the fifth station may determine the channel allocated to the first station, the second station, the third station, the fourth station, and the fifth station based on the A-RTS frame. Specifically, the first station, the second station, the third station, the fourth station, and the fifth station may determine the allocated channel based on the arrangement order of the terminal identifier fields in the A-RTS frame. In addition, the first station transmits the CTS frame through the primary channel Primary CH, the second station transmits the CTS frame through the first secondary channel Secondary CH #1, the third station transmits CTS frame through the second secondary channel Secondary CH #2, the fourth station transmits CTS frame through the third secondary channel Secondary CH #3, and the fifth station transmits CTS frame through the fourth secondary channel Secondary CH #4. The access point transmits plural terminal A-MPDUs through the primary channel Primary CH, the first secondary channel Secondary CH #1, the second secondary channel Secondary CH #2, the third secondary channel Secondary CH #3, and the fourth secondary channel Secondary CH #4. In addition, the first station, the second station, the third station, the fourth station, and the fifth station transmit an ACK frame through the allocated channel. The first station transmits the ACK frame through the primary channel Primary CH, the second station transmits the ACK frame through the first secondary channel Secondary CH #1, the third station transmits ACK frame through the second secondary channel Secondary CH #2, the fourth station transmits ACK frame through the third secondary channel Secondary CH #3, and the fifth station transmits ACK frame through the fourth secondary channel Secondary CH #4.

Figure 14:
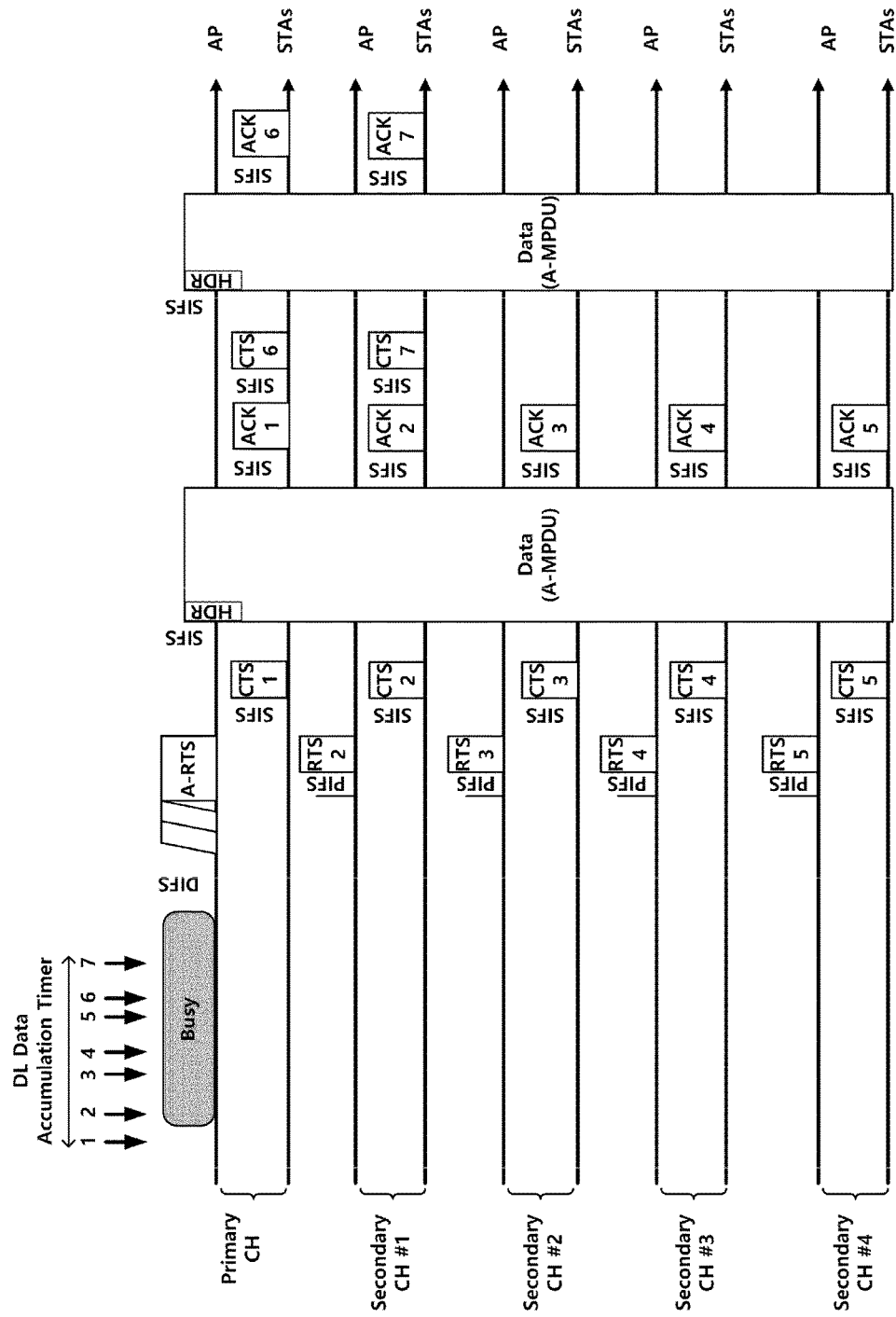

FIG. 14 is a view illustrating that an access point transmits plural terminal A-MPDUs to a plurality of stations according to another embodiment of the present invention when the number of stations receiving the plural terminal A-MPDUs is greater than the number of available channels.

When the number of reception terminals is greater than the number of available channels, the transmission terminal may divide a plurality of terminal data and transmit the divided plurality of terminal data in a plurality of times. This is because the transmission terminal lacks a channel through which the CTS frame and the ACK frame are received from the reception terminal. Specifically, a transmission terminal may first transmit a plurality of terminal data to a plurality of terminals corresponding to the number identical to the number of available channels. Thereafter, when the plurality of terminals receiving the plurality of terminal data transmit an ACK frame, the remaining terminals that do not receive the plurality of terminal data may transmit a CTS frame after a predetermined time from the transmission of the ACK frame. At this point, the predetermined time may be an SIFS. After receiving the CTS frame, the transmission terminal may transmit a plurality of terminal data to the terminal that transmitted the CTS frame. In addition, the transmission terminal may allocate an available channel to the reception terminal in a round robin manner. In addition, the transmission terminal may allocate a primary channel first to the reception terminal among an available primary channel and secondary channel. In addition, the transmission terminal may allocate a secondary channel having a small index first to the reception terminal among available secondary channels.

In the embodiment of FIG. 14, the access point transmits plural terminal A-MPDUs to the first station, the second station, the third station, the fourth station, the fifth station, the sixth station, and the seventh station. At this point, the access point allocates a channel in a round robin manner. Specifically, the access point allocates the primary channel Primary CH to the first station, the first secondary channel Secondary CH #1 to the second station, the second secondary channel Secondary CH#2 to the third station, the third secondary channel Secondary CH #3 to the fourth station, the fourth secondary channel Secondary CH #4 to the fifth station, the primary channel Primary CH to the sixth station, and the first secondary channel Secondary CH #1 to the seventh station. The first station, the second station, the third station, the fourth station, and the fifth station receive plural terminal A-MPDUs through the above-described process and transmits an ACK frame through the allocated channel. After a predetermined time after the ACK frame is transmitted, the sixth station and the seventh station transmit a CTS frame to the allocated channel. At this point, the predetermined time may be an SIFS. The access point receiving a CTS frame from the sixth station and the seventh station transmits plural terminal A-MPDUs to the sixth station and the seventh station.

Figure 15:
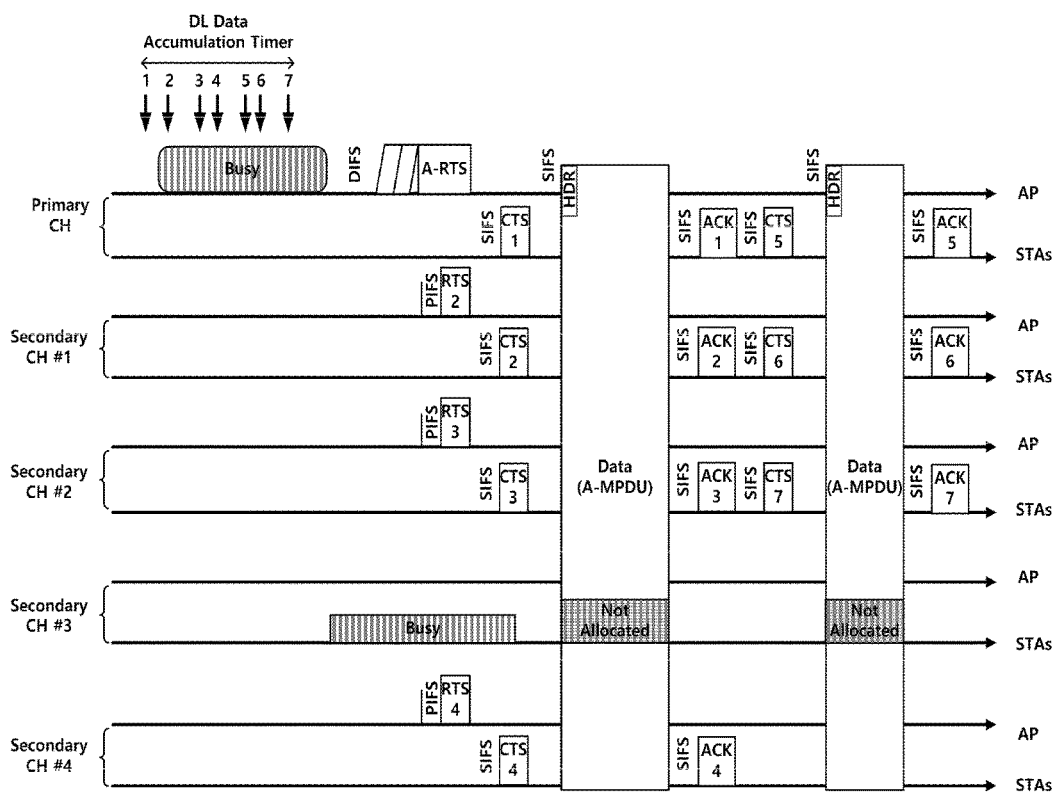

FIG. 15 is a view illustrating that an access point transmits plural terminal A-MPDUs to a plurality of stations according to another embodiment of the present invention when there is no available channel.

A transmission terminal does not allocate a channel, which is being used by another terminal and thus is unavailable, to a reception terminal. Specifically, a transmission terminal does not transmit an RTS frame and an A-RTS frame through a channel that the other terminal uses and thus is unavailable. However, the reception terminal may determine whether all the channels are available before sending the CTS frame. At this time, if a channel not allocated by the transmission terminal is available, the reception terminal may transmit the CTS frame through the corresponding channel. However, the reception terminal may determine a channel allocated by the transmission terminal based on available channels before sending the CTS frame. Specifically, if an available channel when the transmission terminal transmits the A-RTS frame is the primary channel and the second secondary channel and an available channel before the reception terminal transmits the CTS frame is the primary channel, the first secondary channel, and the second secondary channel, the reception terminal may determine the order of the channels that the transmission terminal allocates to the reception terminal as the primary channel, the first secondary channel, and the second secondary channel. The reception terminal may determine whether a channel is available when the channel is in an idle state for a predetermined time. Specifically, the predetermined time may be an SIFS. In another specific embodiment, the predetermined time may be the sum of an SIFS and a PIFS.

In the embodiment of FIG. 15, the access point allocates to a station the remaining channels other than the third secondary channel Secondary CH #3 currently used by another terminal. The access point allocates the primary channel Primary CH to the first station, the first secondary channel Secondary CH #1 to the second station, the second secondary channel Secondary CH#2 to the third station, the fourth secondary channel Secondary CH #4 to the fourth station, the primary channel Primary CH to the fifth station, the first secondary channel Secondary CH #1 to the sixth station, and the second secondary channel Secondary CH#2 to the seventh station. The first station, the second station, the third station, and the fourth station receive plural terminal A-MPDUs through the above-described process and transmit an ACK frame through the allocated channel. After a predetermined time after the ACK frame is transmitted, the fifth station, the six station, and the seventh station transmit a CTS frame to the allocated channel. At this point, the predetermined time may be an SIFS. The access point receiving a CTS frame from the fifth station, the sixth station, and the seventh station, transmits plural terminal A-MPDUs to the fifth station, the sixth station, and the seventh station.

In the embodiments of FIGS. 14 to 15 described above, when the number of reception terminals is larger than the number of available channels, a CTS frame is received as many as the number of available channels from the reception terminal and a plurality of terminal data is transmitted first to the reception terminal that transmits the CTS frame. Thereafter, the CTS frame is required to be received from the remaining reception terminals, and a plurality of terminal data is required to be transmitted to the reception terminal that transmitted the CTS frame. Therefore, the plurality of terminal data is required to be divided and transmitted. When a plurality of reception terminals transmit a control frame to only one specified channel, since the CTS frame is received from all the reception terminals before the plurality of terminal data is transmitted, the plurality of terminal data may be transmitted at a time. At this point, the one specified channel may be the primary channel. In addition, the transmission terminal may transmit an A-RTS frame to one specified channel. Specifically, a plurality of reception terminals may transmit a CTS frame to one specified channel. At this time, since a plurality of reception terminals are not able to transmit CTS frames at the same time, the plurality of reception terminals may sequentially transmit the CTS frames. Specifically, the reception terminal may transmit a CTS frame based on a predetermined transmission order between a plurality of reception terminals. At this point, the reception terminal may determine the order of transmitting CTS frames based on an A-RTS frame. Specifically, the reception terminal may transmit a CTS frame based on the arrangement order of the terminal identifiers in the terminal identifier fields included in the A-RTS frame. In a specific embodiment, the reception terminal may determine the arrangement order of the terminal identifiers in the terminal identifier fields included in the A-RTS frame based on the CTS frame transmission order of a terminal identified by the terminal identifier. For example, if the identifier of the first station, the identifier of the second station, and the identifier of the third station are included in this order in the terminal identifier field of the A-RTS frame, the first station transmits the CTS frame first, and then after the second station transmits the CTS frame, the third station may transmit the CTS frame. When a CTS frame in the latest order is transmitted, the transmission terminal may transmit an RTS frame to the remaining available channels other than one channel specified for allowing the transmission terminal to transmit a control frame. The determining of an available channel may be made based on whether a channel is in an idle state for a predetermined time. At this point, the predetermined time may be an SIFS. Additionally, in another specific embodiment, the predetermined time may be the sum of an SIFS and a PIFS. The transmission terminal may reserve an available channel through the transmission of such an RTS and transmit a plurality of terminal data. The transmission terminal may transmit a plurality of terminal data after receiving the last CTS frame. The reception terminal may receive an A-MPDU and transmit an ACK frame through one specified channel. At this point, the reception terminal may transmit an ACK frame based on a predetermined transmission order between a plurality of reception terminals, such as the transmission of a CTS frame. Specifically, the reception terminal may determine the order of transmitting ACK frames based on an A-RTS frame. Specifically, the reception terminal may transmit an ACK frame based on the arrangement order of the terminal identifiers in the terminal identifier fields in the A-RTS frame. In a specific embodiment, the reception terminal may determine the arrangement order of the terminal identifiers in the terminal identifier fields included in the A-RTS frame based on the ACK frame transmission order of a terminal identified by the terminal identifier. At this point, a value that the duration field of each ACK frame has may be the sum of the transmission time of ACK frames to be transmitted after the transmission of the corresponding ACK frame and a standby time according thereto. At this point, the standby time may be an SIFS. Additionally, when an ACK frame is not received from one reception terminal, the transmission terminal transmits data to a reception terminal that did not transmit an ACK frame after the time point that the last ACK frame is to be received. At this point, data transmitted to the reception terminal may include only data for a corresponding terminal. In another specific embodiment, data transmitted to the reception terminal may be plural terminal A-MPDUs.

Figure 16:
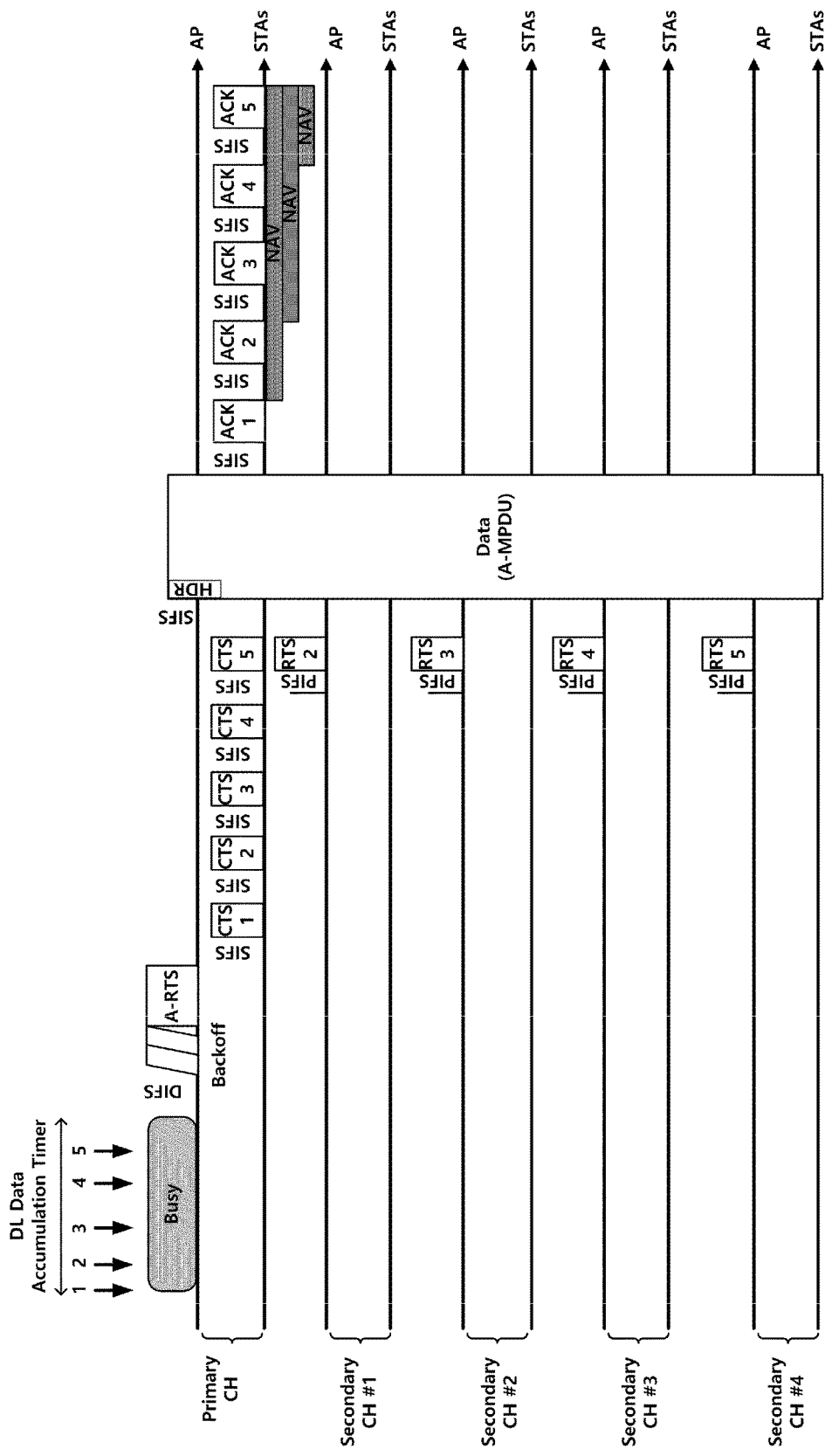

In the embodiment of FIG. 16, a transmission terminal is an access point. The access point transmits plural terminal A-MPDUs to the first station, the second station, the third station, the fourth station, and the fifth station. The access point transmits an A-RTS frame through the primary channel Primary CH. The first station, the second station, the third station, the fourth station, and the fifth station transmit a CTS frame through the primary channel Primary CH. At this point, the first station, the second station, the third station, the fourth station, and the fifth station transmit CTS frames sequentially through the primary channel Primary CH. As described above, the reception terminal may determine the order of transmitting CTS frames based on an A-RTS frame. When the fifth station transmits a CTS frame, the access point transmits an RTS frame through all the available channels other than a channel that the fifth station transmits the CTS frame. Thereafter, the access point transmits plural terminal A-MPDUs. The first station, the second station, the third station, the fourth station, and the fifth station transmit ACK frames sequentially through the primary channel Primary CH. As described above, a value that the duration field of each ACK frame has may be the sum of the transmission time of ACK frames to be transmitted after the transmission of the corresponding ACK frame and an SIFS standby time according thereto.

In the embodiment of FIG. 16, even when the number of reception terminals is greater than the number of available channels, plural terminal A-MPDUs may be transmitted at once. However, if transmission is performed as shown in FIG. 16, it may take a long time to receive an ACK frame. Therefore, there is a need for a method of reducing the time until a transmission terminal receives an ACK frame after data transmission. This will be described with reference to FIGS. 17 and 18.

Figure 17:
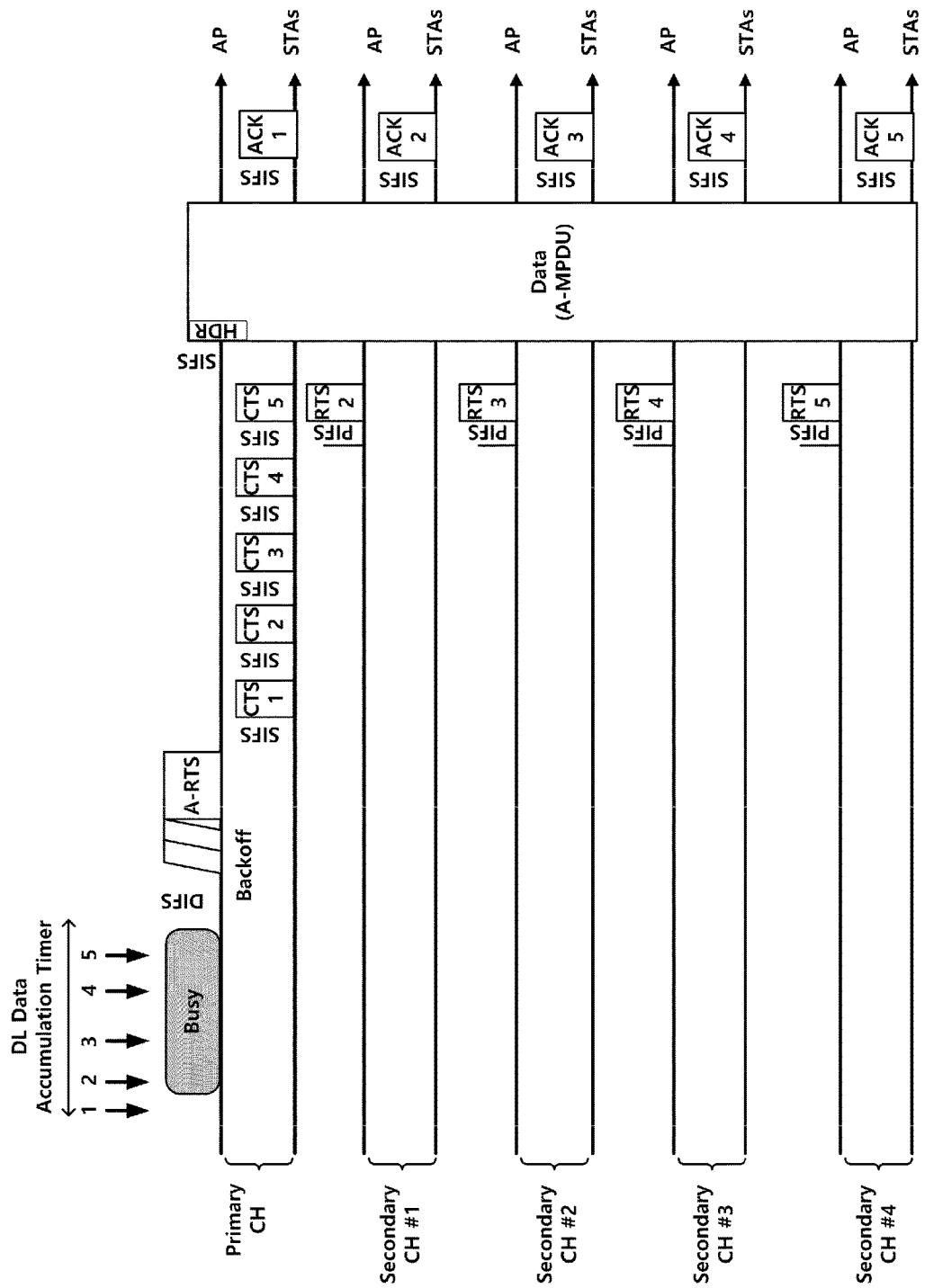

FIG. 17 is a view illustrating that an access point transmits plural terminal A-MPDUs to a plurality of stations according to another embodiment of the present invention when a plurality of stations transmit CTS frames through only one specified channel and transmit ACK frames through different channels at the same time.

As described above, a plurality of reception terminals may transmit a CTS frame through only one specified channel. That is, a plurality of reception terminals receiving a plurality of terminal data from the same transmission terminal may transmit a CTS frame through one specified channel. At this point, the order of transmitting CTS frames may be the same as that described through the embodiment of FIG. 16. In addition, the plurality of reception terminals may transmit ACK frames at the same time through a channel allocated to each terminal. In addition, as described in the embodiments of FIGS. 12 to 15, the reception terminal may determine a channel allocated to the reception terminal based on an A-RTS frame. In another specific embodiment, as described in the embodiments of FIGS. 12 to 15, the reception terminal may determine a channel allocated to the reception terminal based on a plurality of terminal data.

In the embodiment of FIG. 17, the access point transmits plural terminal A-MPDUs to the first station, the second station, the third station, the fourth station, and the fifth station. The access point transmits an A-RTS frame through the primary channel Primary CH. The first station, the second station, the third station, the fourth station, and the fifth station transmit CTS frames sequentially. At this point, the first station, the second station, the third station, the fourth station, and the fifth station, as described above, may determine the transmission order based on an A-RTS frame. As described above, the reception terminal may determine the order of transmitting CTS frames based on an A-RTS frame. When the fifth station transmits a CTS frame, the access point transmits an RTS frame through all the available channels other than a channel that the fifth station transmits the CTS frame. Thereafter, the access point transmits plural terminal A-MPDUs. The first station, the second station, the third station, the fourth station, and the fifth station transmit an ACK frame at the same time through each specified channel. Through such an operation, the time that the transmission terminal receives an ACK frame from the reception terminal may be shortened.

Figure 18:
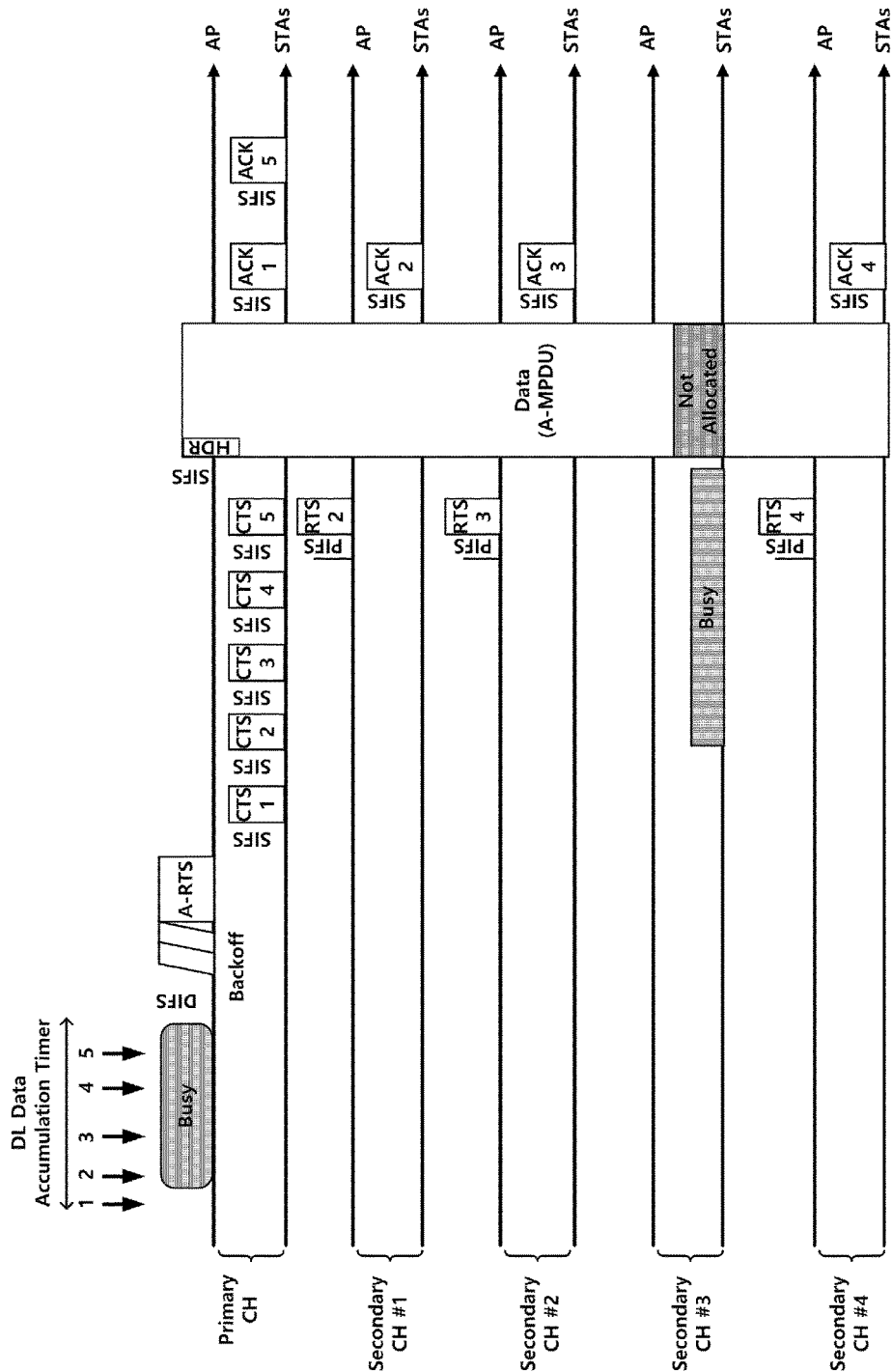

FIG. 18 is a view illustrating that an access point transmits plural terminal A-MPDUs according to an embodiment of the present invention when one channel is unavailable and a plurality of stations transmit CTS frames through only one specified channel and transmit ACK frames through different channels at the same time.

As described above, when a CTS frame is transmitted lastly, the transmission terminal may transmit an RTS frame through all the available channels other than a channel in which the CTS frame is transmitted. At this time, the transmission terminal may determine whether all the channels are available or not. Specifically, it may be determined that a channel is available when the channel is in an idle state for a predetermined time. At this point, the predetermined time may be a PIFS. In another specific embodiment, the predetermined time may be the sum of an SIFS and a PIFS. Therefore, the transmission terminal transmits an RTS frame through a channel except a channel being used by another user. In addition, the transmission terminal may transmit a plurality of terminal data through an available channel except for an unavailable channel being used by another user.

In addition, as described above, a plurality of reception terminals may simultaneously transmit ACK frames through each specified channel. At this time, if the number of available channels is smaller than the number of reception terminals, the reception terminal may determine a specified channel and a transmission order based on an A-RTS frame. Specifically, if the number of available channels is smaller than the number of reception terminals, the reception terminal may determine a specified channel and a transmission order based on the order of the terminal identifies in the terminal identifier field of an A-RTS frame. In a specific embodiment, the reception terminal may determine a specified channel and a transmission order based on that a specified channel is allocated to a reception terminal identified by a terminal identifier in the round-robin manner according to the order of the terminal identifiers in the terminal identifier fields of the A-RTS frame. For example, if an available channel is a primary channel and the terminal identifier field of an A-RTS frame includes the identifier of the first station, the identifier of the second station, and the identifier of the third station in this order, the first station may transmit the ACK frame through the primary channel and the second station may transmit the ACK frame through the first secondary channel. Thereafter, the third station may transmit an ACK frame through the primary channel.

In another specific embodiment, if the number of available channels is smaller than the number of reception terminals, the reception terminal may determine a specified channel and a transmission order based on a plurality of terminal data. Specifically, if the number of available channels is smaller than the number of reception terminals, the reception terminal may determine a specified channel and a transmission order based on the order of the terminal identifies in the terminal identifier fields of the headers of a plurality of terminal data frames. In a specific embodiment, the reception terminal may determine a specified channel and a transmission order based on that a specified channel and a transmission order are allocated to a reception terminal identified by a terminal identifier in the round-robin manner according to the order of the terminal identifiers in the terminal identifier fields of the headers of a plurality of terminal data. For example, if an available channel is a primary channel and a first secondary channel and the terminal identifier fields of the headers of a plurality of terminal data include the identifier of the first station, the identifier of the second station, and the identifier of the third station in this order, the first station may transmit the ACK frame through the primary channel and the second station may transmit the ACK frame through the first secondary channel. Thereafter, the third station may transmit an ACK frame through the primary channel. Additionally, if the number of available channels is smaller than the number of reception terminals, the reception terminal may determine a specified channel and a transmission order based on the arrangement order of a plurality of data in a plurality of terminal data frames. In a specific embodiment, the reception terminal may determine a specified channel and a transmission order based on that a specified channel and a transmission order are allocated to a reception terminal identified by a terminal identifier in the round-robin manner according to the arrangement order of a plurality of data in a plurality of terminal data. For example, if an available channel is a primary channel and a first secondary channel and plural terminal A-MPDUs include an MPDU for the first station, an MPDU for the second station, and an MPDU for the third station in this order, the first station may transmit the ACK frame through the primary channel and the second station may transmit the ACK frame through the first secondary channel.

In the embodiment of FIG. 18, the access point transmits plural terminal A-MPDUs to the first station, the second station, the third station, the fourth station, and the fifth station. The access point transmits an A-RTS frame through the primary channel Primary CH. The first station, the second station, the third station, the fourth station, and the fifth station transmit CTS frames sequentially. At this point, the first station, the second station, the third station, the fourth station, and the fifth station, as described above, may determine the transmission order based on an A-RTS frame. When the fifth station transmits a CTS frame, the access point transmits an RTS frame through all the available channels other than a channel that the fifth station transmits the CTS frame. In the embodiment of FIG. 18, since the third secondary channel Secondary CH #3 is not in the idle state, an RTS frame is transmitted through a channel except for the third secondary channel Secondary CH #3. Thereafter, the access point transmits plural terminal A-MPDUs. At this time, since the third secondary channel Secondary CH #3 is not in an idle state, the transmission terminal transmits plural terminal A-MPDUs through the remaining channels except for the third secondary channel Secondary CH #3. The first station, the second station, the third station, and the fourth station transmit an ACK frame at the same time through each specified channel. The fifth station transmits an ACK frame through the primary channel Primary CH after a predetermined time after the first station transmits the ACK frame. At this point, the predetermined time may be an SIFS. Through such an operation, the time that the transmission terminal receives an ACK frame from the reception terminal may be shortened.

As described above, according to the 802.11ac standard prior to the embodiment of the present invention, communication between terminals is performed through a primary channel and a secondary channel extending the primary channel. Accordingly, in order for one terminal to simultaneously support data for a terminal according to the related art and a terminal supporting the embodiment of the present invention, a transmission terminal is required to transmit plural terminal A-MPDUs through another available channel other than a primary channel and a secondary channel extending the primary channel. This will be described with reference to FIGS. 19 and 20.

Figure 19:
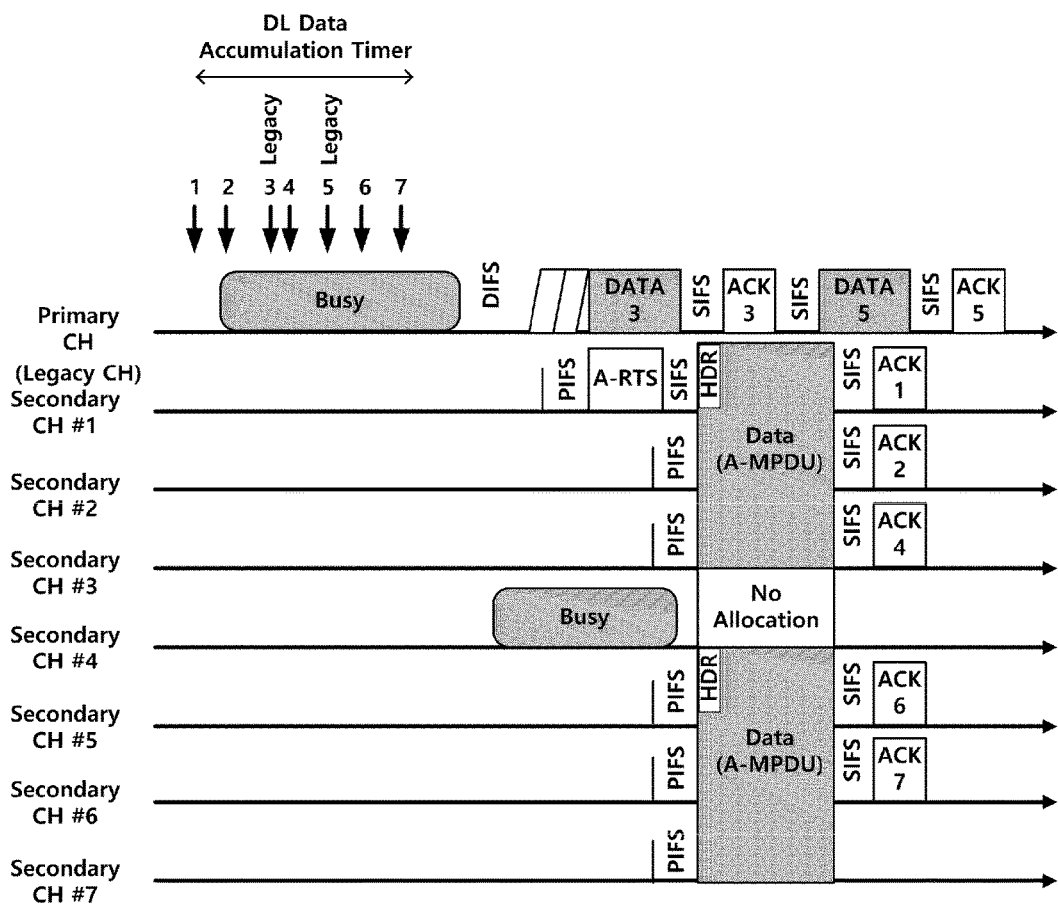

FIG. 19 is a view illustrating that an access point according to another embodiment of the present invention transmits data to a terminal that does not support an embodiment of the present invention and a terminal that supports an embodiment of the present invention.

A transmission terminal may transmit a plurality of terminal data through the remaining available channels other than a primary channel and a secondary channel extending the primary channel. At this time, the transmission terminal may transmit an A-RTS frame through the first secondary channel among the remaining available channels other than a primary channel and a secondary channel extending the primary channel. In addition, the transmission terminal may transmit only an A-RTS frame and transmit a plurality of terminal data immediately without a response for a CTS frame. Specifically, when a predetermined time elapses after an A-RTS frame is transmitted, the transmission terminal may transmit a plurality of terminal data through a primary channel and an available channel not the primary channel. At this point, the predetermined time may be an SIFS. In addition, the transmission terminal may determine that a channel is available when the channel is in an idle state for a predetermined time. In this case, collision may occur with other data transmission due to a hidden node or the like. However, there is an advantage that the time consumption occurring in the transmission process of a CTS frame may be reduced. Each of the plurality of reception terminals may transmit an ACK frame through a channel allocated to each reception terminal as in the above-described embodiment.

In the embodiment of FIG. 19, the access point transmits data to the third station and the fifth station, which do not support an embodiment of the present invention, and the first station, the second station, the fourth station, the sixth station, and the seventh station, which support an embodiment of the present invention. In detail, the access point transmits data to the third station and the fifth station through the primary channel Primary CH. Additionally, the access point transmits an A-RTS frame through the first secondary channel Secondary CH #1, which is an available channel that is not the primary channel Primary CH and a secondary channel extending the primary channel Primary CH. The access point transmits plural terminal A-MPDUs when an SIFS elapses after the A-RTS frame was transmitted. At this time, since the fourth secondary channel Secondary CH #4 is in use by another terminal, the access point may transmit plural terminal A-MPDUs through the first secondary channel Secondary CH #1, the second secondary channel Secondary CH #2, the third secondary channel Secondary CH #3, the fifth secondary channel Secondary CH #5, the sixth secondary channel Secondary CH #6, and the seventh secondary channel CH #7, excluding the fourth secondary channel CH #4. The first station, the second station, the fourth station, the sixth station, and the seventh station transmit an ACK frame to the access point according to an allocated channel.

Figure 20:
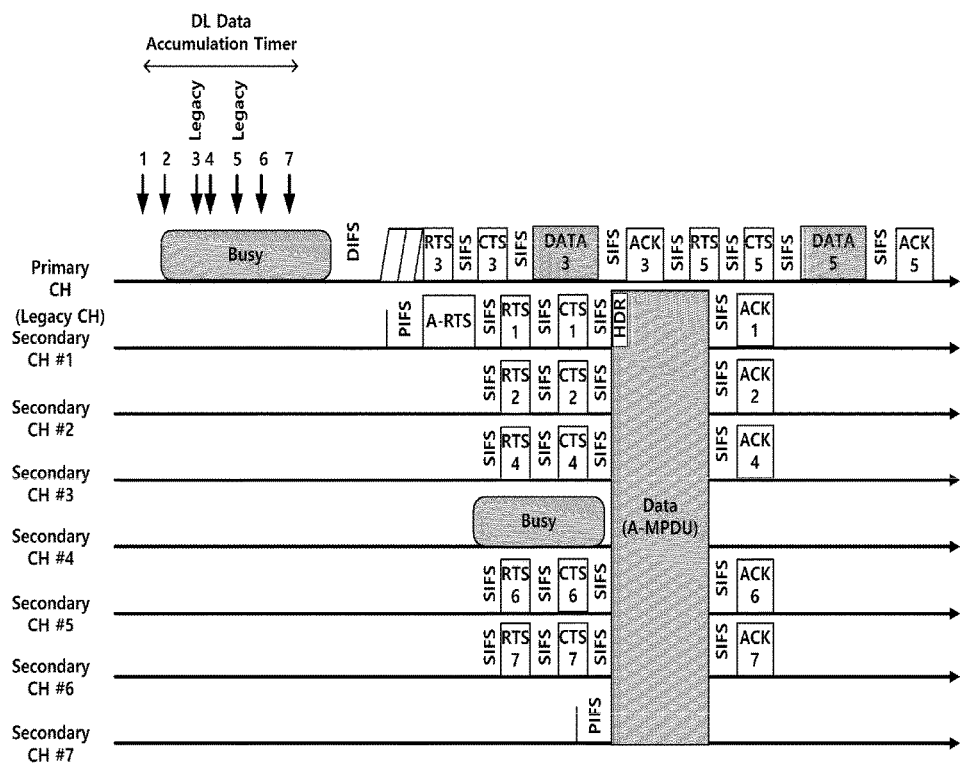

FIG. 20 is a view illustrating that an access point according to another embodiment of the present invention transmits data to a terminal that does not support an embodiment of the present invention and a terminal that supports an embodiment of the present invention.

As described above, a transmission terminal may transmit a plurality of terminal data through the remaining available channels other than a primary channel and a secondary channel extending the primary channel. At this time, the transmission terminal may transmit an A-RTS frame through the first secondary channel among the remaining available channels other than a primary channel and a secondary channel extending the primary channel. Additionally, the transmission terminal may transmit an A-RTS frame to all available channels other than a primary channel and a secondary channel extending the primary channel after transmitting an RTS frame. In another specific embodiment, the transmission terminal may transmit an RTS frame to all available channels other than a primary channel and a secondary channel extending the primary channel while transmitting an A-RTS frame. In addition, the transmission terminal may transmit a plurality of terminal data through a channel available when transmitting the plurality of terminal data in addition to a channel that received a CTS frame. Specifically, the transmission terminal may transmit a plurality of terminal data through a channel in an idle state for a predetermined time when transmitting the plurality of terminal data in addition to a channel that received a CTS frame. At this point, the predetermined time may be a PIFS. For this, the transmission terminal may sense a state of a channel that does not receive a CTS frame.

In the embodiment of FIG. 20, the access point transmits data to the third station and the fifth station, which do not support an embodiment of the present invention, and the first station, the second station, the fourth station, the sixth station, and the seventh station, which support an embodiment of the present invention. In detail, the access point transmits data to the third station and the fifth station through the primary channel Primary CH. Additionally, the access point transmits an A-RTS frame through the first secondary channel Secondary CH #1, which is an available channel that is not the primary channel Primary CH and a secondary channel extending the primary channel Primary CH. When an SIFS elapses from the transmission of an A-RTS frame, the access point transmits an RTS frame to the first station, the second station, the fourth station, the sixth station, and the seventh station. At this point, the access point transmits an RTS frame for each station through a channel allocated to each station. In addition, a CTS frame is transmitted to the first station, the second station, the fourth station, the sixth station, and the seventh station. The access point determines whether a channel through which a CTS frame is transmitted and the remaining channels other than the primary channel are available. It is determined that the fourth secondary channel Secondary CH #4 and the seventh secondary channel Secondary CH #7 are available and thus, the access point transmits plural terminal A-MPDUs to the first station, the second station, the fourth station, the sixth station, and the seventh station through the first secondary channel Secondary CH #1, the second secondary channel Secondary CH#2, the third secondary channel Secondary CH #3, the fourth secondary channel Secondary CH #4, the fifth secondary channel Secondary CH #5, the sixth secondary channel Secondary CH #6, and the seventh secondary channel Secondary CH #7. The first station, the second station, the fourth station, the sixth station, and the seventh station transmit an ACK frame to the access point according to an allocated channel.

In the above-described embodiments, a channel is reserved through an RTS frame or an A-RTS frame, after that a plurality of terminal data is transmitted. In such a case, it is possible to prevent data collision by stably reserving a channel through which plural terminal A-MPDUs are transmitted. However, it takes a long time to transmit an RTS frame or an A-RTS frame, so that data transmission may be delayed. Therefore, when the transmission terminal transmits a plurality of terminal data without securing a channel through an RTS frame or an A-RTS, the risk of collision with another data transmission may be high, but the transmission time point of a plurality of terminal data may be advanced. This will be described with reference to FIGS. 21 to 23.

Figure 21:
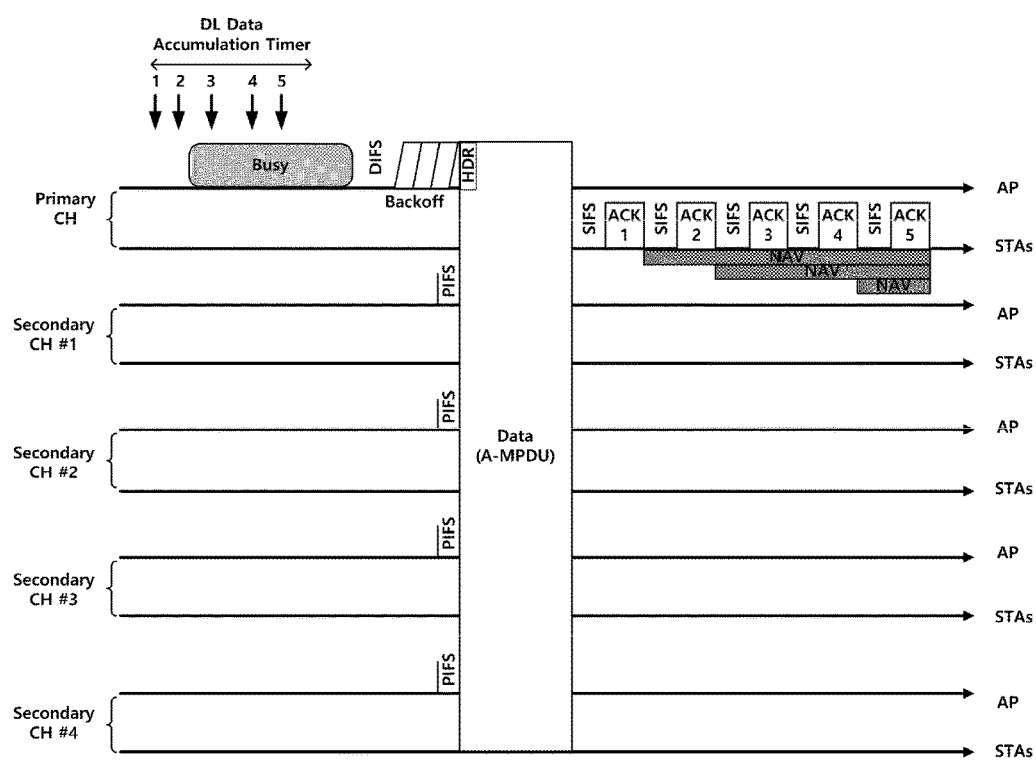
FIGS. 21 to 23 are views that an access point transmits data to a plurality of stations at the same time without transmitting a frame indicating the data transmission preparation according to another embodiment of the present invention.
Figure 22:
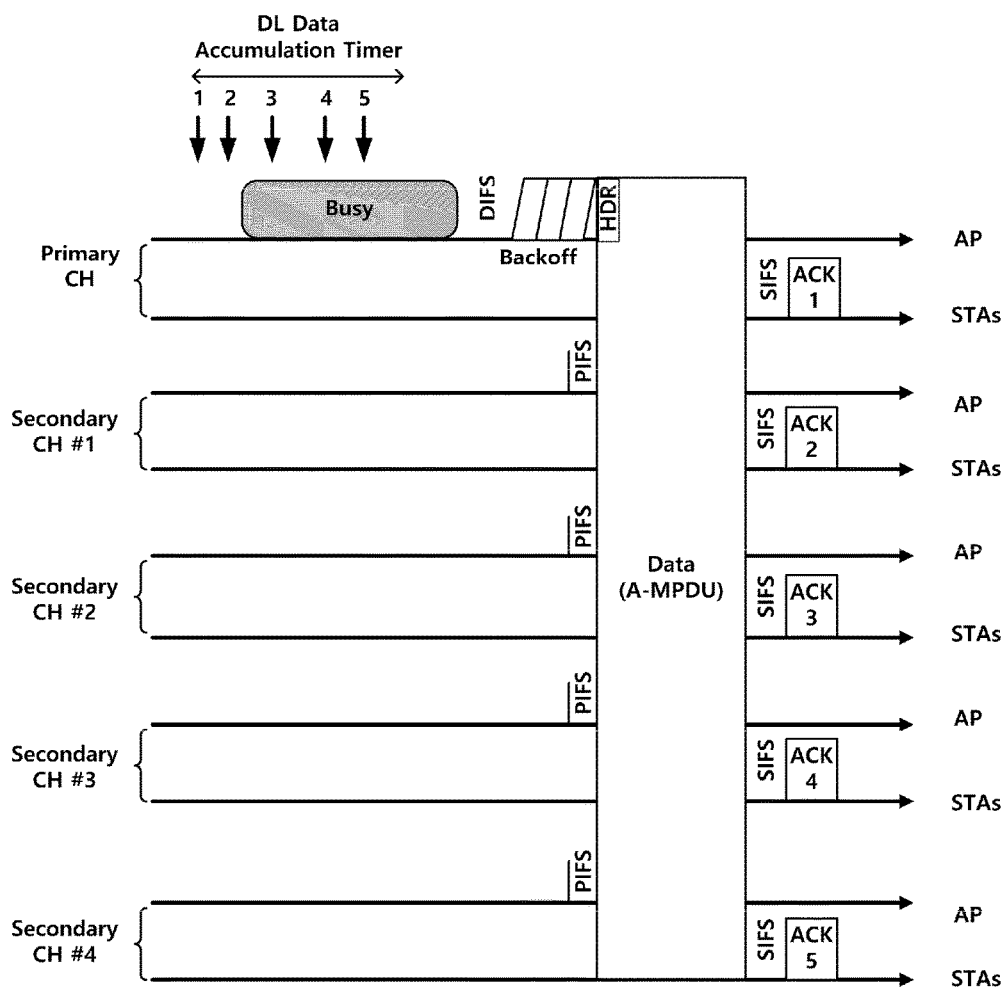
Figure 23:
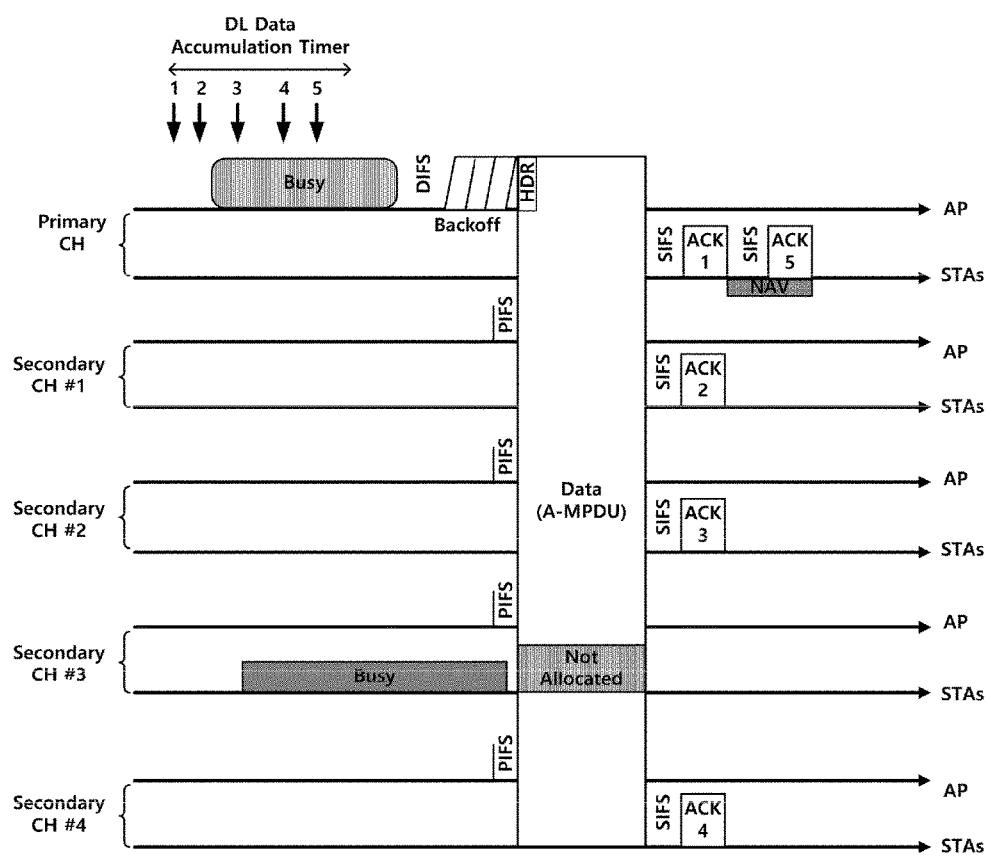

FIGS. 21 to 23 are views illustrating that an access point transmits data to a plurality of stations without transmitting a frame indicating the transmission preparation of a plurality of terminal data according to another embodiment of the present invention.

FIG. 21 is a view illustrating that an access point according to another embodiment of the present invention transmits plural terminal A-MPDUs to a plurality of stations without transmitting a frame indicating data transmission preparation.

A transmission terminal waits for a predetermined time. If a corresponding channel is in an idle state for a predetermined time, the transmission terminal performs a contention procedure for random backoff within a contention window value. At this point, the predetermined time may be a DIFS. In another specific embodiment, the predetermined time may be an Arbitration Inter-frame Space (AIFS). In addition, a corresponding channel may be a primary channel. After a contention procedure, the transmission terminal may transmit a plurality of terminal data through an available channel without the transmission of a frame indicating that data transmission is prepared. Specifically, the transmission terminal may transmit a plurality of terminal data through an available channel without the transmission of an RTS frame and an A-RTS frame. At this time, the transmission terminal may determine whether a corresponding channel is in an idle state for a predetermined time. At this point, the predetermined time may be a PIFS.

A plurality of reception terminals may transmit an ACK frame through one specified channel. Specifically, the reception terminal may transmit an ACK frame based on a predetermined transmission order between a plurality of reception terminals. At this point, the reception terminal may determine the transmission order of ACK frames based on the header of the plurality of terminal data. For example, the reception terminal may determine its transmission order based on the terminal identifier field of the headers of a plurality of terminal data. At this time, the reception terminal may determine the arrangement order of the terminal identifiers in the terminal identifier fields of the plurality of terminal data headers as the order of transmitting an ACK frame of the reception terminal identified by the terminal identifier among the plurality of reception terminals. For example, when the headers of a plurality of terminal data includes the identifier of a terminal in the order of the identifier of the first station and the identifier of the second station, the reception terminal may determine that the first station transmits the ACK frame and after that, the second station transmits the ACK frame. Further, the reception terminal may determine the transmission order of ACK frames based on the arrangement order of the plurality of data in the plurality of terminal data. Specifically, the reception terminal may decode a plurality of terminal data to check the arrangement order of a plurality of data in the plurality of terminal data, and determine the arrangement order of the plurality of data as an order in which a data related reception terminal among a plurality of terminals transmits an ACK frame. For example, when plural terminal A-MPDUs include an MPDU for the first station and an MPDU for the second station in this order, the reception terminal may determine that the first station transmits the ACK frame and after that, the second station transmits the ACK frame. Additionally, the one specified channel may be the primary channel. In another specific embodiment, one specified channel may be any one secondary channel other than a secondary channel extending the primary channel among a plurality of secondary channels. Additionally, when a plurality of reception terminals are redundantly allocated to the same channel, a value that the duration field of each ACK frame has may be the sum of the transmission time of ACK frames to be transmitted after the transmission of the corresponding ACK frame and a standby time according thereto. At this point, the standby time may be an SIFS.

In addition, as described in the embodiment of FIG. 16, a value that the duration field of each ACK frame has may be the sum of the transmission time of ACK frames to be transmitted after the transmission of the corresponding ACK frame and a standby time according thereto. At this point, the standby time may be an SIFS.

In the embodiment of FIG. 21, the access point transmits plural terminal A-MPDUs to the first station, the second station, the third station, the fourth station, and the fifth station. The access point performs a contention procedure. After the contention procedure, the access point may transmit plural terminal A-MPDUs through an available channel without the transmission of a frame indicating that data transmission is prepared. Specifically, without the transmission of a frame indicating that data transmission is prepared, the access point transmits plural terminal A-MPDUs through the primary channel Primary CH, the first secondary channel Secondary CH #1, the second secondary channel Secondary CH #2, the third secondary channel Secondary CH #3, and the fourth secondary channel Secondary CH #4. The reception terminal transmits an ACK frame through the primary channel according to a specified order. Specifically, in the order of the first station, the second station, the third station, the fourth station, and the fifth station, an ACK frame is transmitted through the primary channel.

FIGS. 22 and 23 are views illustrating that an access point according to another embodiment of the present invention transmits plural terminal A-MPDUs to a plurality of stations without transmitting a frame indicating data transmission preparation and the plurality of stations transmit an ACK frame at the same time through a channel allocated to each of the plurality of stations.

When a plurality of reception terminals transmit an ACK frame through one specified channel, it takes a long time until a transmission terminal receives all ACK frames. In order to solve this, as described in the embodiments of FIGS. 17 and 18, each of the plurality of terminals may transmit an ACK frame through a channel allocated to each reception terminal. The reception terminal may determine a channel allocated to the reception terminal based on a plurality of terminal data. Specifically, the reception terminal may determine a channel allocated to the reception terminal based on the headers of a plurality of terminal data. Specifically, the reception terminal may determine a channel allocated to the reception terminal based on the terminal identifier field of the headers of a plurality of terminal data. Specifically, the reception terminal may determine a channel allocated to the reception terminal based on the terminal identifier field of the headers of a plurality of terminal data. In a specific embodiment, the reception terminal may determine the arrangement order of the terminal identifiers in a plurality of terminal data headers as the arrangement order of channels allocated to the reception terminal identified by the terminal identifier. For example, when the headers of a plurality of terminal data includes the identifier of a terminal in the order of the identifier of the first station and the identifier of the second station, the reception terminal may determine that the transmission terminal allocates the first channel among the available channels to the first station and allocates the next channel to the second station. Further, the reception terminal may determine a channel allocated to the reception terminal based on the arrangement order of the plurality of data in the plurality of terminal data. Specifically, the reception terminal may decode a plurality of terminal data, and determine a channel allocated to the reception terminal by checking the arrangement order of a plurality of data in the plurality of terminal data. For example, when plural terminal A-MPDUs include the MPDU for the first station and the MPDU for the second station in this order, the reception terminal may determine that the first channel among the available channels is allocated to the first station and the next channel is allocated to the second station.

In another specific embodiment, if the number of available channels is smaller than the number of reception terminals, the reception terminal may determine a specified channel and a transmission order based on a plurality of terminal data. Specifically, if the number of available channels is smaller than the number of reception terminals, the reception terminal may determine a specified channel and a transmission order based on the order of the terminal identifies in the terminal identifier field of the headers of a plurality of terminal data frames. In a specific embodiment, the reception terminal may determine a specified channel and a transmission order based on that a specified channel and a transmission order are allocated to a reception terminal in the round-robin manner according to the order of the terminal identifiers in the terminal identifier fields of the headers of a plurality of terminal data. For example, if an available channel is a primary channel and a first secondary channel and the terminal identifier fields of the headers of a plurality of terminal data include the identifier of the first station, the identifier of the second station, and the identifier of the third station in this order, the first station may transmit the ACK frame through the primary channel and the second station may transmit the ACK frame through the first secondary channel. Thereafter, the third station may transmit an ACK frame through the primary channel. Additionally, when determining a channel allocated to the reception terminal, the reception terminal may exclude an unavailable channel and determine the channel allocated to the reception terminal. Additionally, if the number of available channels is smaller than the number of reception terminals, the reception terminal may determine a specified channel and a transmission order based on the arrangement order of a plurality of data in a plurality of terminal data. In a specific embodiment, the reception terminal may determine a specified channel and a transmission order based on that a specified channel and a transmission order are allocated to a reception terminal in the round-robin manner according to the arrangement order of a plurality of data in a plurality of terminal data. For example, if an available channel is a primary channel and a first secondary channel and plural terminal A-MPDUs include an MPDU for the first station, an MPDU for the second station, and an MPDU for the third station in this order, the first station may transmit the ACK frame through the primary channel and the second station may transmit the ACK frame through the first secondary channel. Additionally, when a plurality of reception terminals are redundantly allocated to the same channel, a value that the duration field of each ACK frame has may be the sum of the transmission time of ACK frames to be transmitted after the transmission of the corresponding ACK frame and a standby time according thereto. At this point, the standby time may be an SIFS.

In the embodiment of FIG. 22, the access point transmits plural terminal A-MPDUs to the first station, the second station, the third station, the fourth station, and the fifth station. The access point performs a contention procedure. After the contention procedure, the access point may transmit plural terminal A-MPDUs through an available channel without the transmission of a frame indicating that data transmission is prepared. Specifically, without the transmission of a frame indicating that data transmission is prepared, the access point transmits plural terminal A-MPDUs through the primary channel Primary CH, the first secondary channel Secondary CH #1, the second secondary channel Secondary CH #2, the third secondary channel Secondary CH #3, and the fourth secondary channel Secondary CH #4. The reception terminal transmits an ACK frame through an allocated channel. In detail, the first station transmits the ACK frame through the primary channel Primary CH, the second station transmits the ACK frame through the first secondary channel Secondary CH #1, the third station transmits ACK frame through the second secondary channel Secondary CH #2, the fourth station transmits ACK frame through the third secondary channel Secondary CH #3, and the fifth station transmits ACK frame through the fourth secondary channel Secondary CH #4.

In the embodiment of FIG. 23, the third secondary channel Secondary CH #3 is unavailable. Accordingly, without the transmission of a frame indicating that data transmission is prepared, the access point transmits plural terminal A-MPDUs through the primary channel Primary CH, the first secondary channel Secondary CH #1, the second secondary channel Secondary CH #2, and the fourth secondary channel Secondary CH #4. In addition, the reception terminal transmits an ACK frame through a channel allocated to the reception terminal in a specified order. At this point, when determining a channel allocated to the reception terminal, the reception terminal may exclude a channel, which is an unavailable channel and thus not allocated, and determine the channel allocated to the reception terminal. In detail, the first station transmits the ACK frame through the primary channel Primary CH, the second station transmits the ACK frame through the first secondary channel Secondary CH #1, the third station transmits ACK frame through the second secondary channel Secondary CH #2, and the fourth station transmits ACK frame through the fourth secondary channel Secondary CH #4. After the transmission of the first station, the fifth station transmits an ACK frame through the primary channel Primary CH. At this point, the value of the duration field of the ACK frame transmitted by the first station may be the sum of the ACK frame transmission time of the fifth station and an SIFS according thereto.

Figure 24:
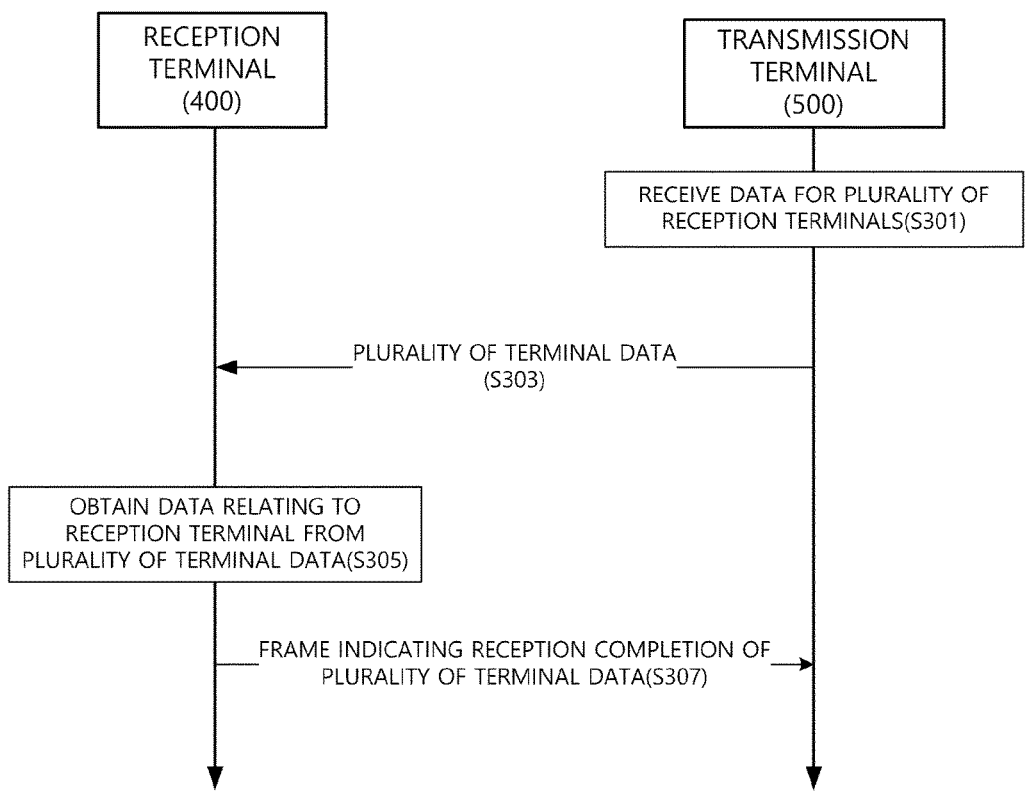
FIG. 24 is a ladder diagram illustrating an operation that a terminal transmits data to a plurality of other terminals at the same time according to an embodiment of the present invention.

FIG. 24 is a ladder diagram illustrating an operation that a terminal transmits data to a plurality of other terminals at the same time according to an embodiment of the present invention.

A transmission terminal 500 receives data for a plurality of reception terminals (S301). Specifically, the transmission terminal 500 may collect data for a plurality of reception terminals to generate plural terminal A-MPDUs. A plurality of terminal data may include a plurality of terminal data headers for signaling data in the plurality of terminal data. As described above, the plural terminal A-MPDUs may include a plurality of MPDUs. At this time, the first MPDU of the plurality of MPDUs may be a header for signaling data included in the plural terminal A-MPDUs. Additionally, the headers of a plurality of terminal data may include a group address for identifying a group that represents a plurality of reception terminals. Additionally, the headers of a plurality of terminal data may include information on a channel used by a wireless communication terminal and an MCS of a signal used in the channel. In addition, the headers of a plurality of terminal data may include user information indicating a relationship between a plurality of data in the plurality of terminal data and a plurality of reception terminals. Additionally, the user information may indicate a channel allocated to the plurality of reception terminals. The plurality of reception terminals may transmit a control frame to the transmission terminal through an allocated channel. At this point, the control frame may be a frame indicating the reception completion of data. At this point, the frame may be an ACK frame. In addition, the control frame may be a frame indicating that data is able to be received. At this point, the frame may be a CTS frame.

The transmission terminal 500 transmits a plurality of terminal data to the reception terminal 400 based on data for a plurality of reception terminals (S303). Specifically, the transmission terminal 500 may transmit plural terminal A-MPDUs to the reception terminal 400. The reception terminal 400 receives a plurality of terminal data from the transmission terminal 500. Specifically, the reception terminal 400 may receive plural terminal A-MPDUs from the transmission terminal 500. The transmission terminal 500 may transmit a frame indicating the preparation of data transmission before transmitting a plurality of terminal data. At this point, the frame indicating preparation may be an A-RTS frame indicating the transmission preparation of a plurality of terminal data. At this point, the A-RTS frame may include a plurality of terminal identifiers for identifying a plurality of reception terminals and the number of the plurality of reception terminals. In addition, the frame indicating transmission preparation may be an RTS frame indicating that the data transmission for one terminal is ready. The reception terminal 400 may transmit a frame indicating that data is able to be received to the transmission terminal 500. At this point, the frame may be a CTS frame. The reception terminal 400, as described above, may transmit a control frame relating to the transmission control of a MAC frame through a channel allocated to the reception terminal 400. As described above, the reception terminal 400 may determine a channel allocated to the reception terminal based on an A-RTS frame. Specifically, the reception terminal 400 may determine a channel allocated to the reception terminal based on the arrangement order of the terminal identifiers in an A-RTS frame. In addition, the reception terminal 400 may determine a channel allocated to the reception terminal based on a plurality of terminal data. Specifically, a channel allocated to the reception terminal 400 may be determined based on the arrangement order of the terminal identifiers in a plurality of terminal data. In addition, the reception terminal 400 may determine a channel allocated to the reception terminal based on the arrangement order of a plurality of data in a plurality of terminal data. In addition, a plurality of reception terminals including the reception terminal 400, as described above, may transmit a control frame relating to the transmission control of a MAC frame through one specified transmission channel. At this point, the reception terminal 400 may transmit a control frame based on a transmission order between a plurality of reception terminals that transmit the control frame. The reception terminal 400 may determine a transmission order based on an A-RTS frame. Specifically, the reception terminal 400 may determine a transmission order based on the arrangement order of the terminal identifiers in an A-RTS frame. In addition, the reception terminal 400 may determine a transmission order based on a plurality of terminal data. Specifically, a transmission order may be determined based on the arrangement order of the terminal identifiers in a plurality of terminal data. In addition, the reception terminal 400 may determine a transmission order based on the arrangement order of a plurality of data in a plurality of terminal data. At this point, the control frame may include a frame indicating that the reception is possible. In addition, the control frame may include a frame indicating that the reception is completed.

The reception terminal 400 obtains data relating to the reception terminal from a plurality of terminal data (S305). Specifically, the reception terminal 400 may obtain an MPDU relating to the reception terminal from plural terminal A-MPDUs. The reception terminal 400 may obtain an MPDU relating to the reception terminal based on user information indicating a relationship between a plurality of data in a plurality of terminal data included in the headers of the plurality of terminal data and a plurality of reception terminals. Specifically, the reception terminal 400 may determine the location of an MPDU including data related to the reception terminal 400 based on the arrangement order of the terminal identifiers in the headers of a plurality of terminal data. In another specific embodiment, the reception terminal 400 may obtain an MPDU relating to the reception terminal based on the terminal identifier field of an A-RTS frame. Specifically, the reception terminal 400 may determine the location of an MPDU including data related to the reception terminal 400 based on the arrangement order of the terminal identifier fields in an A-RTS frame.

The reception terminal 400 transmits a frame indicating the reception completion of a plurality of terminal data (S307). As described above, the reception terminal 400 may transmit a frame indicating reception completion through a channel allocated to the reception terminal 400. A method of determining a channel allocated to a reception terminal may be the same as that described in operation 5303 for transmitting a plurality of terminal data to the reception terminal 400. In addition, a plurality of reception terminals including the reception terminal 400, as described above, may transmit a frame indicating the reception completion through one transmission channel. At this point, the reception terminal 400 may transmit a frame indicating the reception completion based on a transmission order between a plurality of reception terminals that transmit the frame indicating the reception completion. A method of determining a transmission order may be the same as that described in operation 5303 for transmitting a plurality of terminal data to the reception terminal 400. The frame indicating reception completion may be an ACK frame.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal comprising:
a transceiver; and
a processor,
wherein the processor receives, through the transceiver, a first control frame which reserves a channel for a transmission between a transmission terminal and a first plurality of wireless communication terminals and includes information on each of channels respectively allocated to each of the first plurality of wireless communication terminals, from the transmission terminal,
transmits, by using the transceiver, a second control frame in response to the first control frame through a channel allocated to the wireless communication terminal which is indicated by the information to the transmission terminal when at least one of terminal identifier fields included in the first control frame indicates the wireless communication terminal, wherein a receiver address of the first control frame is a group address which indicates a second plurality of wireless communication terminals including the first plurality of wireless communication terminals, wherein the terminal identifier fields include a plurality of association identifiers, wherein each of the plurality of association identifiers respectively identifies the each of the first plurality of wireless communication terminals, and
receives, through the transceiver, a data frame which is transmitted based on the second control frame, from the transmission terminal,
wherein the first control frame includes a duration field which is used for setting a network allocation vector for the transmission between the transmission terminal and the first plurality of wireless communication terminals.

2. The wireless communication terminal of claim 1, wherein the processor transmits the second control frame to the transmission terminal, when the channel allocated to the wireless communication terminal is idle.

3. The wireless communication terminal of claim 2, wherein the processor transmits the second control frame to the transmission terminal, when the channel allocated to the wireless communication terminal is idle for a predetermined time from a time point at which the first control frame is received.

4. The wireless communication terminal of claim 3, wherein the predetermined time is a Short Inter-Frame Space(SIFS).

5. The wireless communication terminal of claim 1, wherein the each of channels respectively allocated to each of the first plurality of wireless communication terminals are same each other.

6. A wireless communication terminal comprising:
a transceiver; and
a processor,
wherein the processor inserts, in a first control frame which reserves a channel for a transmission between the wireless communication terminal and a first plurality of wireless communication terminals, information on each of channels respectively allocated to each of the first plurality of wireless communication terminals,
sets a receiver address of the first control frame as a group address which indicates a second plurality of wireless communication terminals including the first plurality of wireless communication terminals,
inserts a plurality of association identifiers in terminal identifier fields of the first control frame, wherein each of the plurality of association identifiers respectively identifies the each of the first plurality of wireless communication terminals,
transmits, through the transceiver, the first control frame, to the first plurality of wireless communication terminals,
receives, through the transceiver, a second control frame which is a response to the first control frame, from at least one of the first plurality of wireless communication terminals, and
transmits, through the transceiver, a data frame based on the second control frame,
wherein the first control frame includes a duration field which is used for setting a network allocation vector for the transmission between the wireless communication terminal and the first plurality of wireless communication terminals.

7. The wireless communication terminal of claim 6, wherein the each of channels respectively allocated to each of the first plurality of wireless communication terminals are same each other.

8. An operation method of a wireless communication terminal comprising:
receiving a first control frame which reserves a channel for a transmission between a transmission terminal and a first plurality of wireless communication terminals and includes information on each of channels respectively allocated to each of the first plurality of wireless communication terminals, from the transmission terminal,
transmitting a second control frame in response to the first control frame through a channel allocated to the wireless communication terminal which is indicated by the information to the transmission terminal, when at least one of terminal identifier fields included in the first control frame indicates the wireless communication terminal, wherein a receiver address of the first control frame is a group address which indicates a second plurality of wireless communication terminals including the first plurality of wireless communication terminals, wherein the terminal identifier fields include a plurality of association identifiers, wherein each of the plurality of association identifiers respectively identifies the each of the first plurality of wireless communication terminals, and
receiving a data frame which is transmitted based on the second control frame, from the transmission terminal,
wherein the first control frame includes a duration field which is used for setting a network allocation vector for the transmission between the transmission terminal and the first plurality of wireless communication terminals.

9. The operation method of claim 8, wherein the transmitting the second frame through the channel allocated to the wireless communication terminal comprises,
transmitting the second control frame to the transmission terminal, when the channel allocated to the wireless communication terminal is idle.

10. The operation method of claim 9, wherein the transmitting the second frame to the transmission terminal, when the channel allocated to the wireless communication terminal is idle, comprises
transmitting the second control frame to the transmission terminal, when the channel allocated to the wireless communication terminal is idle for a predetermined time from a time point at which the first control frame is received.

11. The operation method of claim 10, wherein the predetermined time is a Short Inter-Frame Space(SIFS).

12. The operation method of claim 8, wherein the each of channels respectively allocated to each of the first plurality of wireless communication terminals are same each other.

* * * * *

UNITED STATES PATENT AND TRADEMARK OFFICE
CERTIFICATE OF CORRECTION

PATENT NO. : 10,085,243 B2  
APPLICATION NO. : 15/322720  
DATED : September 25, 2018  
INVENTOR(S) : Kim et al.

Page 1 of 1

It is certified that error appears in the above-identified patent and that said Letters Patent is hereby corrected as shown below:

On the Title Page

Item (73), Line 3, add the following:  
--& SK TELECOM CO., LTD--

Signed and Sealed this  
Twentieth Day of November, 2018

Andrei Iancu  
*Director of the United States Patent and Trademark Office*